United States Patent [19]

Okano et al.

[11] Patent Number: 6,008,733
[45] Date of Patent: *Dec. 28, 1999

[54] AIR CONDITIONING SYSTEM MASTER/SLAVE CONTROL UNIT DETERMINATION

[75] Inventors: Takashi Okano; Kouji Kamafusa; Hisatoshi Kawakami, all of Osaka, Japan

[73] Assignee: Daikin Industries, Ltd., Osaka, Japan

[*] Notice: This patent issued on a continued prosecution application filed under 37 CFR 1.53(d), and is subject to the twenty year patent term provisions of 35 U.S.C. 154(a)(2).

[21] Appl. No.: 08/663,106

[22] PCT Filed: Oct. 31, 1995

[86] PCT No.: PCT/JP95/02235

§ 371 Date: Jun. 28, 1996

§ 102(e) Date: Jun. 28, 1996

[87] PCT Pub. No.: WO96/13956

PCT Pub. Date: May 9, 1996

[30] Foreign Application Priority Data

Oct. 31, 1994 [JP] Japan ................................ 6-266674
Dec. 15, 1994 [JP] Japan ................................ 6-311658

[51] Int. Cl.$^6$ .................................................. G05B 23/02
[52] U.S. Cl. ............................... 340/825.06; 340/825.42; 307/127; 307/138; 307/38; 327/28; 361/246
[58] Field of Search ................... 340/825.06, 825.22, 340/825.44, 825.5; 307/127, 138, 38, 39, 41, 42; 327/28, 29, 30; 361/245, 246

[56] References Cited

U.S. PATENT DOCUMENTS

| | | |
|---|---|---|
| 4,803,481 | 2/1989 | Mueller et al. .................... 340/825.5 |
| 5,323,149 | 6/1994 | Hoult et al. ...................... 340/825.5 X |
| 5,400,017 | 3/1995 | Yoshisaka et al. ................ 340/825.06 |
| 5,404,137 | 4/1995 | Levien ............................. 340/825.5 X |
| 5,564,025 | 10/1996 | De Freese et al. ............ 340/825.06 X |

FOREIGN PATENT DOCUMENTS

| | | |
|---|---|---|
| 52-7694 | 3/1977 | Japan . |
| 59-229988 | 12/1984 | Japan . |
| 1288133 | 11/1989 | Japan . |

*Primary Examiner*—Brian Zimmerman
*Assistant Examiner*—William H. Wilson, Jr.
*Attorney, Agent, or Firm*—Sixbey, Friedman, Leedom & Ferguson, PC; Eric Robinson; Donald R. Studebaker

[57] ABSTRACT

A plurality of air conditioning system control units are connected to each other through a communication line (20). Discharge resistors (R1, R2) are provided for discharging residual charges of the communication line (20). The control unit has a power superposition circuit (50) for applying a direct-current voltage and outputs an identification number signal from the power superposition circuit (50) to the communication line (20). The control unit further has a polarity select circuit (60) having a negative-polarity resistance characteristic that current increasingly flows as an applied voltage is lowered, and a voltage discriminating circuit (70) for detecting the terminal voltage of the polarity select circuit (60). When detecting the voltage of the communication line (20), the control unit determines whether its own control unit is a master unit or a slave unit according to output signals from the voltage discriminating circuit (70) and a polarity discriminating circuit (3C).

12 Claims, 27 Drawing Sheets

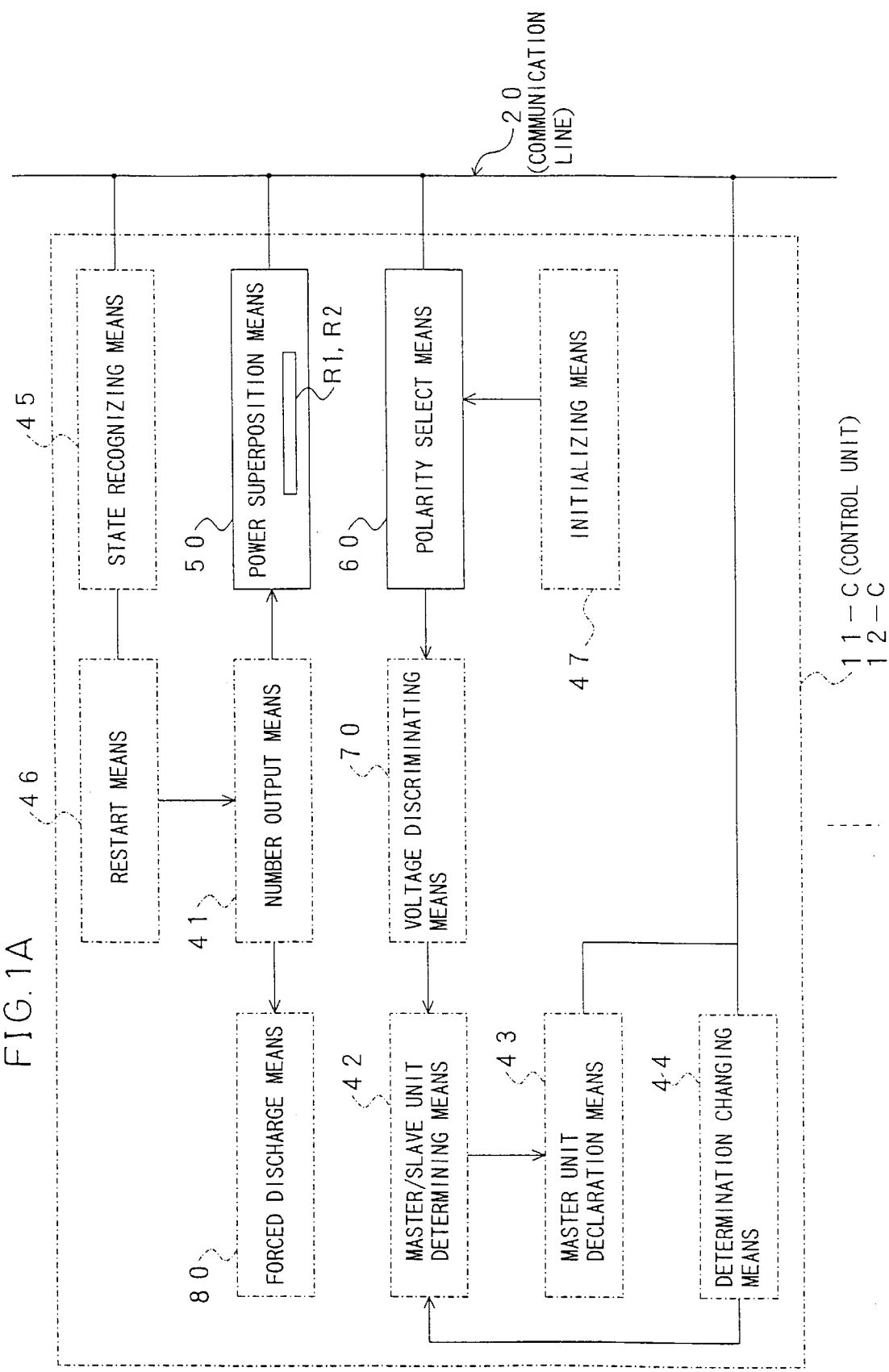

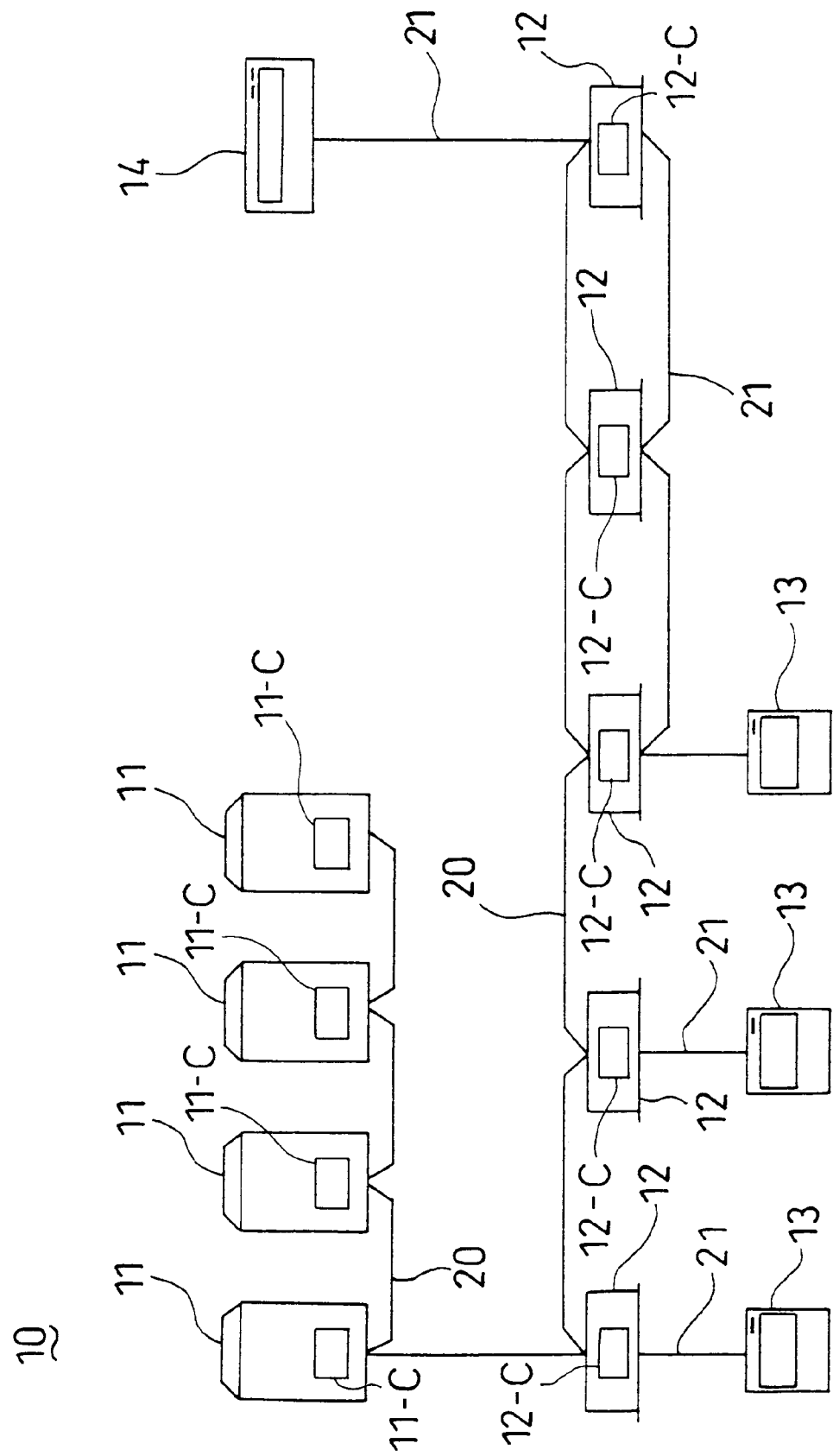

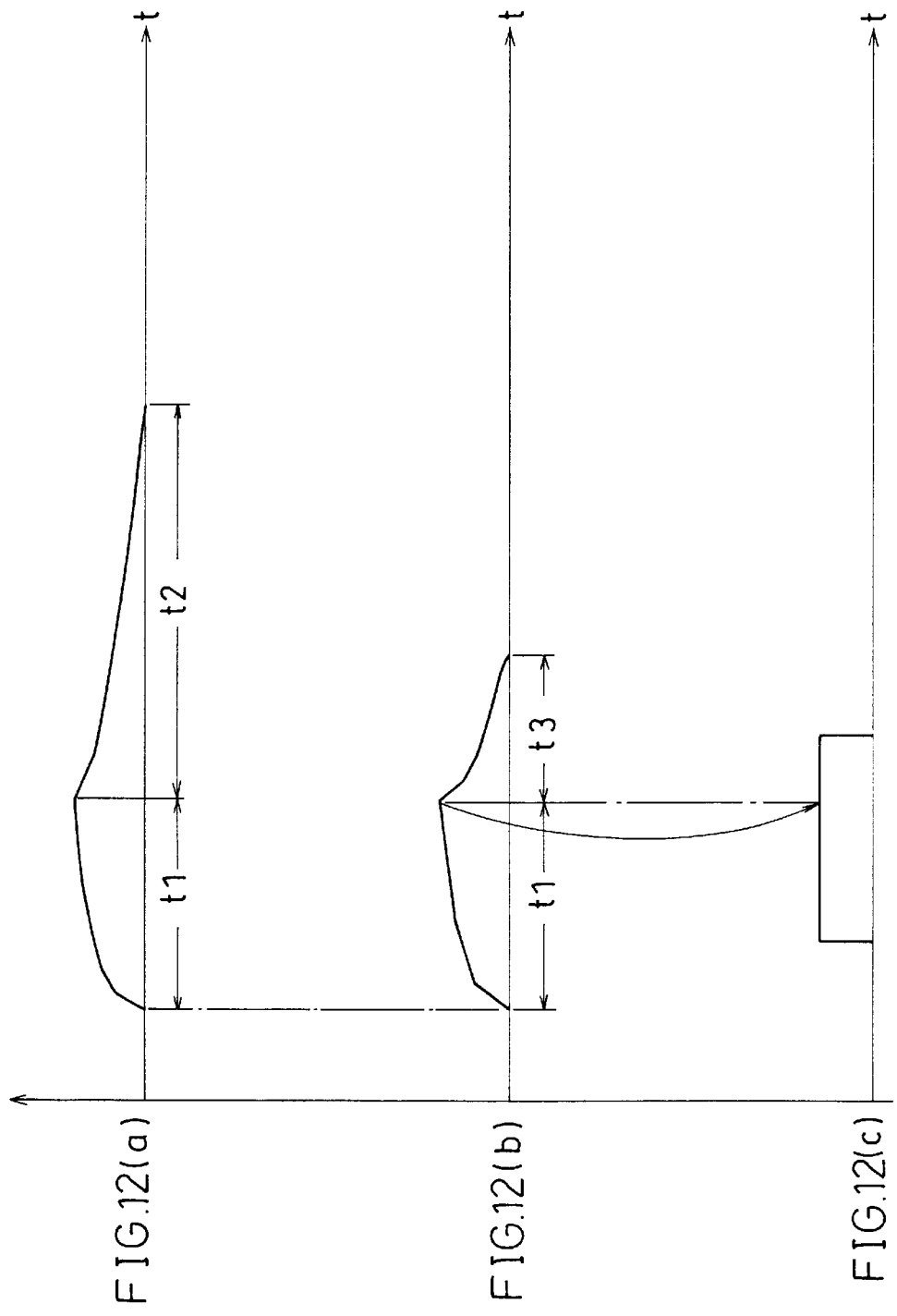

6,008,733

AIR CONDITIONING SYSTEM MASTER/SLAVE CONTROL UNIT DETERMINATION

TECHNICAL FIELD

This invention relates to a transmission device and an operation control device for an air conditioner, and in particular relates to the same using the AMI (Alternate Mark Inversion) communication method.

BACKGROUND ART

Conventionally, there have been air conditioners in which the AMI communication method is used as a signal transmission method between an outdoor unit and an indoor unit.

In the AMI communication method, data items are transmitted according to the predetermined polarity of a signal. If the polarities between the input and output units are not matched with each other due to misconnection or the like, this produces a problem that the contents of data cannot be correctly read out.

For example, if an A unit and a B unit which are connected through a communication line have opposite polarities, when both the units transmit data at the same time, data signals from both the units superpose and cancel each other in the communication line. This reduces the voltage level of the communication line to 0, thereby eliminating data signals.

For this reason, in a conventional transmission device for an air conditioner as disclosed in Japanese Patent Application Laid-Open Gazette No.1-288133, a remote control is connected to a driver and a receiver through an analog switch. When an input signal has a different polarity, ports of the driver and the receiver are switched to other ports so that the transmitting output and the receiving input are matched in polarity with each other.

However, in the above-mentioned transmission device for the air conditioner, determination about the match or mismatch between the polarities is made according to whether the data signal has a designated format. This produces a problem that it is not possible to determine the match or mismatch between the polarities unless a data signal is transmitted by an indoor control unit or the like.

To solve the problem, for example, there has been an air conditioner wherein a DC power source is connected to the communication line to apply a DC voltage thereto and each unit is provided with a transmission circuit, a reception circuit and a polarity discriminating circuit for discriminating the polarity of the communication line, whereby all the units are matched in polarity with each other.

Problems That the Invention is to Solve

In the above-mentioned air conditioner, for commonality of components, each of the indoor units and the outdoor units is provided with a power superposition circuit having a DC power source for polarity discrimination and a discharge resistor for discharging a residual charge in the communication line. The power superposition circuit of any one of the outdoor units and the indoor units applies a DC voltage to the communication line and the discharge resistor is connected to the communication line.

However, if the setting that connects the power superposition circuit of either one of the indoor units and the outdoor units to the communication line is manually made, this requires an address setting. In addition, a problem may occur that two power superposition circuits of two outdoor units are connected to the communication line nevertheless it is essential only that a single power superposition circuit is connected to the communication line. Further, there may be another problem of producing an improper setting wherein the power superposition circuit is not connected to the communication line.

Furthermore, recently, there have been cases that an air conditioner which has a plurality of outdoor units to form a plurality of refrigerant circuits is installed and data transmission is made through a single communication line which connects the plurality of outdoor units and the indoor units.

In this case, it is preferable that the above-mentioned power superposition circuit is provided in each outdoor unit for commonality of outdoor units and the like. If the setting that either one of the power superposition circuits of the outdoor units should be connected to the communication line is manually made, this may produce an improper setting that two power superposition circuits of two outdoor units are connected to the communication line.

For this reason, it can be considered to automatically set the outdoor unit whose power superposition circuit should be connected to the communication line. If only the automatic setting is made, this requires much time every time for the setting. In detail, if one outdoor unit whose power superposition circuit is connected to the communication line is determined and thereafter another outdoor unit is connected to the communication line, an automatic setting operation must be made again. This produces a problem that it takes much time to start air conditioning operation.

This invention has been made in view of the forgoing problems and has its object of readily and securely establishing connection of the power superposition means thereby allowing the polarity of the communication line to be discriminated.

Another object of this invention is to reduce the time for determination of a thermal-source-side control unit for making power superposition, thereby promptly activating air conditioning operation.

DISCLOSURE OF INVENTION

Summary of the Invention

A feature of this invention is in that a control unit is provide with a polarity select circuit having a negative-polarity resistance characteristic and when the terminal voltage of the polarity select circuit is reduced by electric power superposition, the subject unit is determined to be a master unit.

Another feature of this invention is in that when another control unit outputs, at set time intervals, a master unit declaration signal for connecting a power superposition circuit to the communication line and a subject control unit receives the master unit declaration signal, the subject control unit turns to a slave unit.

Specific Matters of the Invention

More specifically, as shown in FIG. 1A, a technique taken in the invention of claim 1 premises a transmission device in which a plurality of control units (11-C, 11C, . . . ) are connected to each other through a communication line (20) composed of a positive side signal line (2a) and a negative side signal line (2b) and an information signal is bidirectionally transmitted at a proper polarity between the control units (11-C, 11-C, . . . ).

In addition, the control units (11-C, 11-C, . . . ) each have power superposition means (50) for applying a set direct-current voltage from a power source (DC) to the communication line (20) as shown in FIG. 3.

Further, the control units (11-C, 11-C, . . . ) each have polarity select means (60). The polarity select means (60) has a negative-polarity resistance characteristic that current increasingly flows as the applied voltage is lowered and is connected in series to the power source (DC), wherein the voltage Vm corresponding to the minimum current value based on the negative-polarity resistance characteristic is set larger than the power source voltage, the maximum current value Id based on the negative-polarity resistance characteristic is set smaller than the minimum overcurrent value Is of the communication line (20), the terminal voltage drops when the terminal voltage has the same polarity as in the communication line (20) and the terminal voltage rises when the terminal voltage is different in polarity from the communication line (20).

A technique of the invention of claim 2 is so designed that in the invention of claim 1, the transmission device further comprises discharge resistors (R1, R2) for discharging residual charges of the positive side signal line (2a) and the negative side signal line (2b) forming the communication line (20).

Further, the control units (11-C, 11-C, . . . ) each have number output means (41) for controlling the power superposition circuit (50) to base-band modulate a power source voltage to be superposed on the voltage of the communication line (20) and outputting to the communication line (20) a binary identification number signal based on a unit number pre-assigned to the control unit (11-C, 11-C, . . . ).

Furthermore, the control unit (11-C, 11-C, . . . ) has a voltage discriminating means (70) for detecting the terminal voltage of the polarity select means (60) and outputting a low-voltage signal when the terminal voltage is a set voltage or less and a high-voltage signal when the terminal voltage is above the set voltage, respectively.

In addition, the control units (11-C, 11-C, . . . ) each have master/slave unit determining means (42) for observing the voltage of the communication line (20), determining the control unit to be a slave unit whose power superposition means (50) applies no direct-current voltage to the communication line (20) when detecting a high-level voltage of the communication line (20) at the time of outputting a low-voltage bit of an identification number signal of the control unit, determining the control unit to be a slave unit when the voltage discriminating means (70) outputs a high-voltage signal at the time of outputting a high-voltage bit of the identification number signal of the control unit, determining the control unit to be a master unit whose power superposition means (50) applies a direct-current voltage to the communication line (20) when the voltage discriminating means (70) outputs a low-voltage signal and the entire identification number signal of the control unit is outputted, and then deactivating the number output means (41) to complete the operation of determining to be a master unit or a slave unit.

A technique of the invention of claim 3 is so designed that in the invention of claim 2, the discharge resistors (R1, R2) are provided in the power superposition means (50).

A technique of the invention of claim 4 is so designed that in the invention of claim 2 or 3, the control unit (11-C, 11-C, . . . ) comprises forced discharge means (80) for discharging charges in the communication line (20) immediately after the number output means (41) outputs a high-voltage bit of an identification number signal of the control unit.

A technique of the invention of claim 5 is so designed that in the invention of claim 2 or 3, the number output means (41) outputs an identification number signal to which a low-level verification signal is added after outputting the unit number of the control unit.

A technique of the invention of claim 6 is so designed that in the invention of claim 2 or 3, the control unit (11-C, 11-C, . . . ) comprises master unit declaration means (43) for outputting a master unit declaration signal to the communication line (20) when the master/slave unit determining means (42) determines a master unit, and determination changing means (44) for changing the master unit determined by the master/slave unit determining means (42) to a slave unit when the determination changing means (44) receives a master unit declaration signal from another control unit (11-C, 11-C, . . . ) and the control unit (11-C, 11-C, . . . ) which has outputted the master unit declaration signal has a greater unit number.

A technique of the invention of claim 7 is so designed that in the invention of claim 2 or 3, the control unit (11-C, 11-C, . . . ) comprises state recognizing means (45) for recognizing an unsteady state in polarity of the communication line (20) and restart means (46) for restarting operations of the number output means (41) and the master/slave unit determining means (42) to determine whether to be a master unit or a slave unit when the state recognizing means (45) recognizes an unsteady state in polarity of the communication line (20).

A technique of the invention of claim 8 is so designed that in the invention of claim 2 or 3, the control unit (11-C, 11-C, . . . ) comprises initializing means (47) for applying a set voltage to the polarity select means (60) so that the polarity select means (60) has a designated voltage value at the initial operating point.

A technique of the invention of claim 9 is so designed that in the invention of claim 2 or 3, the control units (11-C, 11-C, . . . ) each control air conditioning operation.

Further, as shown in FIG. 1B, a technique of the invention of claim 10 is directed to an operation control device for air conditioner, in which a plurality of control groups (1A, 1B, . . . ) are each composed so that a single or plurality of user-side control units (12-C) are connected to a thermal-source-side control unit (11-C) through a local transmission line (2S) so as to be data-transmittable between the thermal-source-side control unit (11-C) and the user-side control unit (12-C), the thermal-source-side control units (11-C, 11-C, . . . ) of the plurality of control groups (1A, 1B, . . . ) are connected to each other through a centralized transmission line (2T) so as to be data-transmittable between the thermal-source-side control units (11-C, 11-C, . . . ), and a single communication line (20) is so formed that the centralized transmission line (2T) is connected at the respective thermal-source-side control units (11-C, 11-C, . . . ) to the respective local transmission lines (2S, 2S, . . . ) so as to be data-transmittable between the centralized transmission line (2T) and the local transmission lines (2S, 2S, . . . ).

Each of the thermal-source-side control units (11-C, 11-C, . . . ) comprises a power superposition circuit (50) for superposing electric power on the voltage of the communication line (20), and switching means (51) which opens and closes for connection and disconnection between the power superposition circuit (50) and the communication line (20). Furthermore, each of the thermal-source-side control units (11-C, 11-C, . . . ) comprises master unit declaration means (4B) that when the thermal-source-side control unit (11-C) is determined to be a master unit for power superposition, closes the switching means (51) and outputs a master unit declaration signal at set time intervals. In addition, the thermal-source-side control unit (11-C, 11-C, . . . ) comprises slave unit determining means (4C) that when receiving a master unit declaration signal from another thermal-source-side control unit (11-C, 11-C, . . . ), opens the switching means (51) and determines its own control unit to be a slave unit which does not superpose electric power on the communication line (20).

A technique of the invention of claim 11 further comprises, in addition to the invention of claim 10, forcedly setting means (BI) for externally forcedly inputting a master unit setting signal to the master unit declaration means (4B) so that the master unit declaration means (4B) outputs a master unit declaration signal.

A technique of the invention of claim 12 is so designed that in the invention of claim 10, the thermal-source-side control unit (11-C) comprises master-to-slave unit change means (4D) that when receiving a power superposition signal from a centralized controller connected to the centralized transmission line (2T) with outputting a master unit declaration signal, opens the switching means (51) and outputs a master unit canceling signal to the master unit declaration means (4B) to stop the output of the master unit declaration signal thereby changing the thermal-source-side control unit (11-C) to a slave unit.

A technique of the invention of claim 13 is so designed that in the invention of claim 10, data transmission is made so as to transmit AMI signals and the power superposition means (50) superposes direct-current power for discriminating the polarity of the communication line (20) on the communication line (20).

Operations

Under the above structure, in the invention of claim 1, the polarity select means (60) of each of the control units (11-C, 11-C, . . . ) has a negative-polarity resistance characteristic in the state that a direct-current voltage is applied to the communication line (20) by the power superposition means (50). Accordingly, the terminal voltage of the polarity select means (60) which has the same polarity as in the communication line (20) is decreased, whereas the terminal voltage of the polarity select means (60) which has the different polarity from the communication line (20) is increased.

More specifically, in the inventions of claims 2, 3 and 9, in the condition that no control units (11-C, 11-C, . . . ) are determined to be a master unit or a slave unit, all the number output means (41) output identification number signals respectively so that the identification number signals compete with each other in the communication line (20).

Since different unit numbers are pre-assigned to the control units (11-C, 11-C, . . . ) respectively, each of the number output means (41) outputs an identification number signals from its least significant bit.

Subsequently, in the case of a high-voltage bit, the power superposition means (50) is switched on, for example, relay switches (Ry1-1, Ry1-2) provided in the power superposition means (50) are turned on. Thereby, data "1" is outputted so that determination is made about whether to win in polarity determination.

In other words, when the plurality of power superposition means (50) of the control units (11-C, 11-C, . . . ) are switched on, the terminal voltage of the polarity select means (60) which has the same polarity as in the communication line (20) is decreased, whereas the terminal voltage of the polarity select means (60) with a different polarity from the communication line (20) is increased.

Thereafter, when the voltage discriminating means (70) of a control unit outputs a low-voltage signal, the master/slave unit determining means (42) of the control unit determines the winning of the control unit in polarity determination. On the other hand, when the voltage discriminating means (70) of a control unit outputs a high-voltage signal, the master/slave unit determining means (42) of the control unit determines the defeat of the control unit in polarity determination.

At the time, in the invention of claim 8, the initializing means (47) applies a set voltage to the polarity select means (60) to reduce the operating time of each polarity select means (60).

When a control unit outputs a low-voltage bit of data "0" in the state that another control unit (11-C, 11-C, . . . ) applies a direct-current voltage to the communication line (20), the master/slave unit determining means (42) of the subject control unit determines the defeat of the control unit in polarity determination. Such above operations are repeated and the control unit (11-C) having outputted the entire identification number signal is determined to be a master unit.

In the invention of claim 4, the number output means (41) output a high-voltage bit, the forced discharge means (80) forcedly discharges charges in the communication line (20) and charges stored in interface parts of the units connected to the communication line (20).

In the invention of claim 5, in the case that the identification number signals are different in position from each other by 1 bit or more, different unit numbers may be matched in bit state with each other. In such cases, an identification number signal includes an added verification signal and the control unit (11-C) having finished out putting the identification number signal in advance applies s voltage from the power source (DC). Accordingly, the control unit (11-C) having not outputted its entire identification number signal detects a high-level voltage of the communication line (20) when outputting a low voltage-level verification signal, so that the defeat of the control unit in polarity determination is determined.

In the invention of claim 6, when the master/slave unit determining means (42) of a control unit determines that the control unit is a master unit, the master unit declaration means (43) of the control unit outputs a master unit declaration signal to the communication line (20). Then, for example, when two control units (11-C) output respective master unit declaration signals, one control unit (11-C) compares its own unit number with that of the other control unit (11-C) having outputted the master unit declaration signal. When the own unit number is greater than that of the other control unit, the subject control unit keeps itself a master unit. When the unit number of the other control unit (11-C) is greater than the own unit number, the determination change means (44) of the subject control unit changes the unit setting to a slave unit.

In the invention of claim 7, when a master unit produces a fault or the like, the state discriminating means (45) of the master unit discriminates an unsteady state in polarity of the communication line (20). Accordingly, the restart means (46) of the master unit restarts an operation of determining to be a master unit or a slave unit so that the other control unit (11-C) is determined to be a master unit.

In the invention of claim 10, data transmission is made through the local transmission line (2S) between the thermal-source-side control unit (11-C) and the user-side control units (12-C, 12-C, . . . ) in each control group (1A, 1B, . . . ), and data transmission is also made through the centralized transmission line (2S) between the control groups (1A, 1B, . . . ). In particular, in the invention of claim 13, data transmission is made using AMI signals.

Further, from among the thermal-source-side control units (11-C, 11-C, . . . ), a master unit that connects the power superposition circuit (50) to the communication line (20) and supplies electric power to the communication line (20) is set. With the master unit set, one control group (1C) may be additionally connected and a thermal-source-side control unit (11-C) may be added to the centralized transmission line (2T).

In such a case, since the thermal-source-side control unit (11-C) determined to be a master unit outputs a master unit declaration signal, the additional thermal-source-side control unit (11-C) receives the master unit declaration signal, stops the output of a master unit declaration signal and opens the switching means (51), so that the additional thermal-source-side control unit (11-C) is determined to be a slave unit that does not supply electric power.

In the invention of claim 11, for example, by the throwing of a main switch, determination of a master unit for power supply is made from among the plurality of control groups (1A, 1B, ... ). At the time, when the forcedly setting means (BI) of one thermal-source-side control unit (11-C) is switched on so that a master unit setting signal is inputted to the thermal-source-side control unit (11-C), the master unit declaration means (4B) of the thermal-source-side control unit (11-C) having received the master unit setting signal outputs a master unit declaration signal. As a result, the thermal-source-side control unit (11-C) in which the forcedly setting means (BI) has been operated is changed to a master unit and other thermal-source-side control units (11-C, 11-C, ... ) are determined to be slave units.

In the invention of claim 12, when the centralized controller (50) is first not connected to the centralized transmission line (2T) and is then connected to the centralized transmission line (2T), since the centralized controller (50) is formatted to be a master unit at any time, the centralized controller (50) is set to a master unit to output a power superposition signal to the centralized transmission line (2T).

Consequently, the thermal-source-side control unit (11-C) as a master unit is changed to a slave unit by the master-to-slave unit change means (4D) and the master unit declaration means (4B) stops the transmission of a master unit declaration signal according to a master unit canceling signal from the master-to-slave unit change means (4D), so that all the thermal-source-side control units (11-C, 11-C, ... ) are changed to slave units.

Effects of the Invention

According to the inventions of claims 1, 2 and 9, since a master unit is determined based on unit numbers pre-assigned to respective control units (11-C, 11-C, ... ), a setting operation that connects the power superposition means (50) to the communication line (20) is not required, thereby simplifying the setting operation.

Further, improper settings such as connection to the communication line (20) of two power superposition means (50) can be securely prevented.

In particular, since the control units is provided with polarity select means (60) having a negative-polarity resistance characteristic, the polarity of the communication line (20) can be discriminated by the terminal voltage of the polarity select means (60) even if the control unit is connected at different polarity to the communication line. This allows a correct determination about whether a subject unit is a master unit or a slave unit.

According to the invention of claim 3, since the power superposition means (50) is provided with discharge resistors (R1, R2), there is no need to provide a choke coil or the like between the direct-current power source (DC) and the communication line (20). This presents a simple circuit configuration.

According to the invention of claim 4, provision of the forced discharge means (80) enables a secure discharge of charges in the communication line (20) after a high-voltage bit of an identification number signal is outputted, thereby reducing a data transmission time.

According to the invention of claim 5, since a low-voltage level verification signal is added to an identification number signal, determination about whether a subject unit is a master unit or a slave unit can be correctly made by the verification signal even if signals are shifted from each other by 1 bit or more.

According to the invention of claim 6, the output of a master unit declaration signal enables determination of one master unit even if a plurality of master units are set, thereby securely preventing improper setting of a master unit.

According to the invention of claim 7, when an unsteady state in polarity of the communication line (20) is determined, an operation of determining whether a subject unit is a master unit or a slave unit can be restarted. Thereby, even in the case of malfunction of a master unit, another control unit (11-C, 11-C, ... ) can be set to a new master unit so that the polarity discrimination can be continuously made. Consequently, transmission of information signals can be continuously made. This enhances reliability of control.

According to the invention of claim 8, since the initial operating point of the polarity select means (60) has a specific voltage, this reduces an operating time of the polarity select means (60), thereby reducing a time for determination about whether a subject unit is a master unit or a slave unit.

According to the invention of claim 10, the thermal-source-side control unit (11-C) set to a master unit outputs a master unit declaration signal at set time intervals and the other thermal-source-side control unit (11-C) receiving the master unit declaration signal turns to a slave unit. Therefore, even if an additional thermal-source-side control unit (11-C) is provided, there is no need to reset a maser unit for power supply. This reduces a time for determination of a master unit. As a result, air conditioning can be promptly started, thereby presenting enhanced air conditioning control and enhanced comfortableness.

In particular, according to the invention of claim 13, since power supply for polarity discrimination can be promptly made in date transmission using AMI signals, the start of air conditioning can be advanced. This enhances air conditioning control.

According to the invention of claim 11, since the thermal-source-side control unit (11-C) is manually set to a master unit by the forcedly setting means (BI), the setting of a master unit can be promptly made. This reduces a time for determination of a master unit thereby promptly starting air conditioning operation.

According to the invention of claim 12, connection of the centralized controller (50) leads to setting of the centralized controller (50) to a master unit, and the thermal-source-side control unit (11-C) as a master unit changes itself to a slave unit when receiving a power superposition signal from the centralized controller (50). Accordingly, there is no need to reset a master unit. This reduces a time for determination of a master unit, thereby promptly starting air conditioning operation.

BRIEF DESCRIPTION OF THE DRAWINGS

FIG. 1A is a block diagram showing the configuration of the invention according to claims 1 to 9.

FIG. 2 is a diagram showing the control system hardware configuration of an air conditioner according to Embodiment 1 of this invention.

FIGS. 12(a), (b) and (c), is a signal waveform diagram showing forced discharge by a forced discharge means.

BEST MODE FOR CARRYING OUT THE INVENTION

Embodiment 1

Figure 1B:
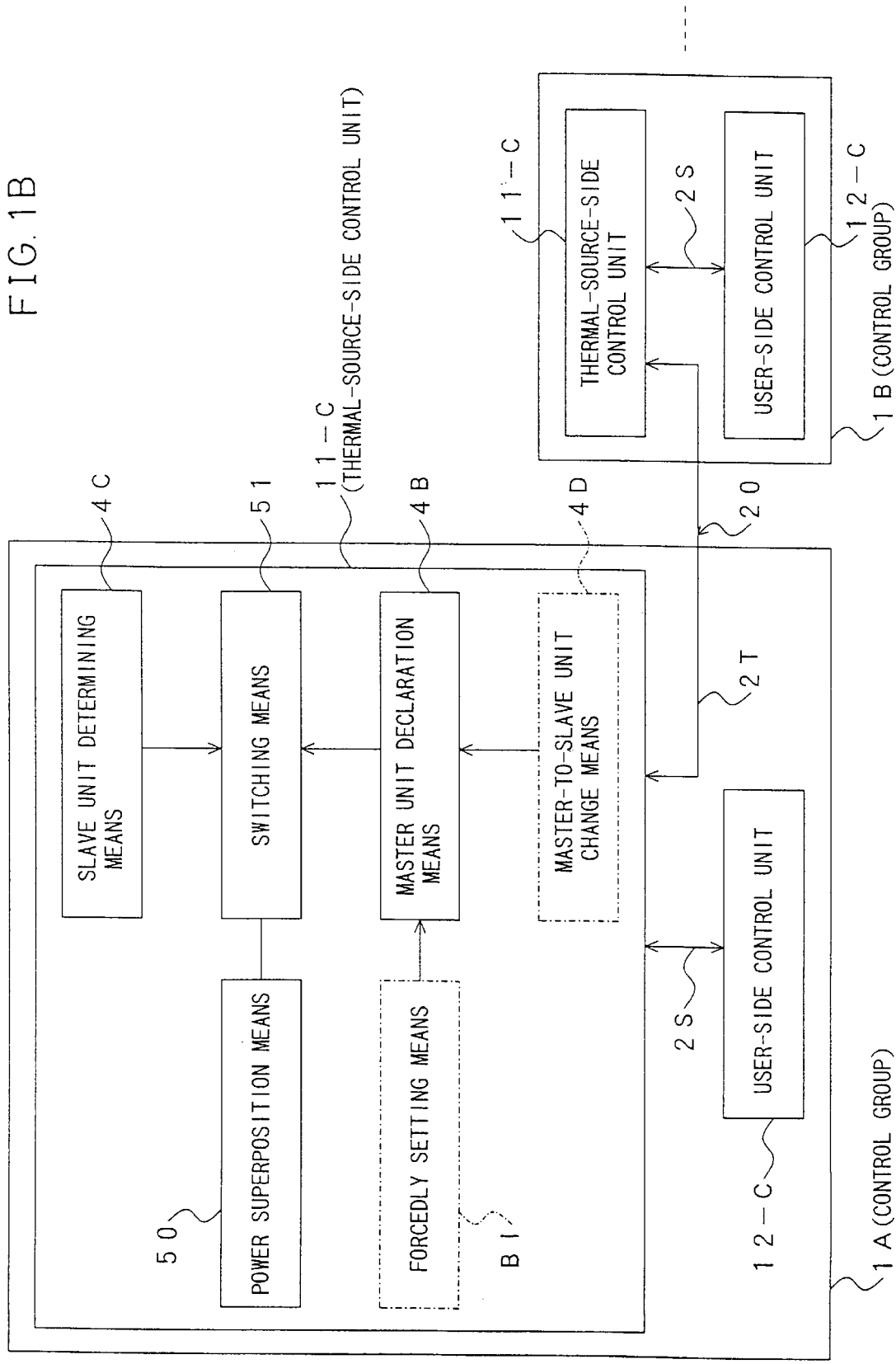
FIG. 1B is a block diagram showing the configuration of the invention according to claims 10 to 13.

Detailed description is made below about Embodiment 1 of this invention with reference to the drawings.

System Configuration

FIG. 2 shows a control system of an air conditioner (10). The air conditioner (10) has four outdoor units (11, 11, ...) and a plurality of indoor units (12, 12, ...). Four outdoor control units (11-C, 11-C, ...) for controlling the respective outdoor units (11, 11, ...) are sequentially connected to a plurality of indoor control units (12-C, 12-C, ...) for controlling the respective indoor units (12, 12, ...) through a communication line (20) formed of two signal lines. Information signals for air conditioning control are transmitted and received between the outdoor control units (11-C, 11-C, ...) and the indoor control units (12-C, 12-C, ...).

Further, the indoor control units (12-C, 12-C, ...) are sectioned into a plurality of air conditioning groups. In each air conditioning group, a remote control (13) is connected to each indoor control unit through a communication path (21) formed of two signal lines. Information signals for air conditioning control are transmitted and received between the indoor control unit (12-C) and the remote control (13). A centralized controller (14) as one control unit is connected to the communication line (20). Information signals for air conditioning control are transmitted and received between the centralized controller (14) and the outdoor control units (11-C, 11-C, ...) and between the centralized controller (14) and the indoor control units (12-C, 12-C, ...).

For a transmission method among the outdoor control unit (11-C), the indoor control unit (12-C), the remote control (13) and the centralized controller (14), the balanced communication mode in the AMI communication method is used. The transmission mode is designed so as to make half-duplex signal transmission at a preset polarity.

The outdoor unit (11) has at least an outdoor heat exchanger including a compressor, a four-way selector valve and a fan and an outdoor motor-operated expansion valve, though they are not shown. The indoor control unit (12) has at least an indoor motor-operated expansion valve and an indoor heat exchanger including a fan, though they are not shown. Each refrigerant circulating circuit is designed so as to be reversible in a refrigerant circulating direction between a cooling operation mode and a heating operation mode.

Configuration of Outdoor Control Unit (11-C)

Figure 3:
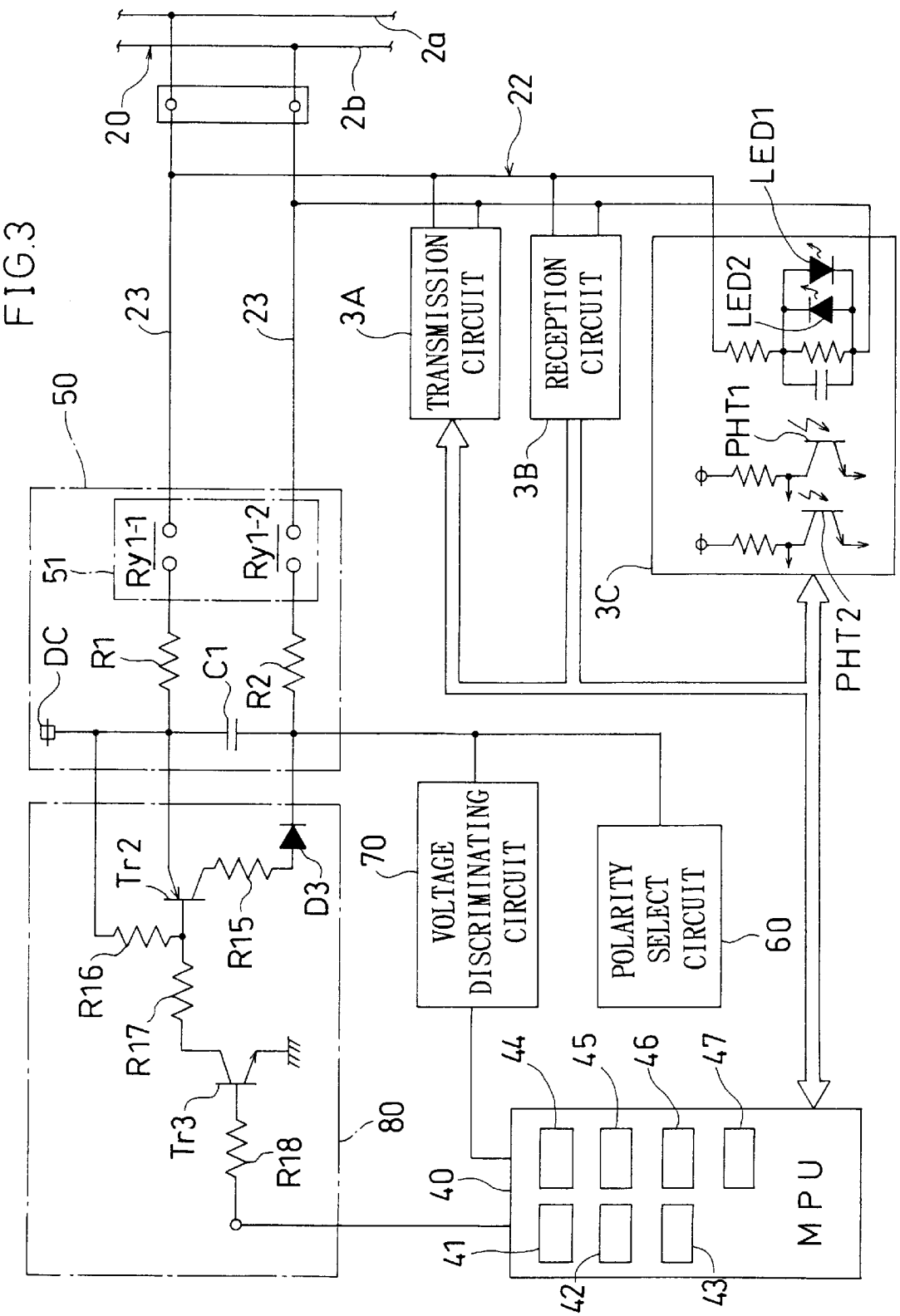
FIG. 3 is a circuit block diagram of necessary portion of an outdoor unit.

As shown in FIG. 3, the outdoor control unit (11-C) comprises a transmission circuit (3A), a reception circuit (3B) and a polarity discriminating circuit (3C). The transmission circuits (3A), the reception circuit (3B) and the polarity discriminating circuit (3C) are connected to an MPU (40). The indoor control unit (12C), the remote control (13) and the centralized controller (14) are each provided with a transmission circuit (3A), a reception circuit (3B) and a polarity discriminating circuit (3C) which are the same circuit configuration as in the below-mentioned outdoor control unit (11-C), though they are not shown. Therefore, only the circuit configuration of the outdoor control unit (11-C) will be typically described for the control units of other types. The communication line (20) is formed of a positive side signal line (2a) and a negative side signal line (2b).

The transmission circuit (3A) is connected to the communication line (20) through a common line (22), has non-shown two drivers, and outputs information signals to the communication line (20) according to output signals from the MPU (40).

The reception circuit (3B) connected to the communication line (20) through the common line (22), receives information signals of the communication line (20) and outputs them to the MPU (40).

The polarity discriminating circuit (3C) is connected to the positive side signal line (2a) and the negative side signal line (2b) of the communication line (20) through the common line (20) and discriminates each polarity of the positive side signal line (2a) and the negative side signal line (2b). The polarity discriminating circuit (3C) further has two light emitting diodes (LED1, LED2) and two phototransistors (PHT1, PHT2) and is designed so as to output a polarity signal to the MPU (40) by ON-operation of either one of phototransistors (PHT1, PHT2). The transmission circuit (3A) inverts an information signal to transmit based on a discrimination of different polarity by the polarity discriminating circuit (3C).

The outdoor control units (11-C, 11-C, ...) are each provided with a power superposition circuit (50), a polarity select circuit (60), a voltage discriminating circuit (70) and a forced discharge circuit (80). As one of features of this invention, the outdoor control units (11-C, 11-C, ...) are each designed so as to determine a unit which applies a direct-current voltage to the communication line (20) and connects the discharge resistors (R1, R2) to the communication line (20). That is, since the number of the outdoor control units (11-C, 11-C, ...) are less than that of the indoor control units (12-C, 12-C, ...), the power superposition circuit (50) is provided only in the outdoor control units (11-C, 11-C, ...) for cost saving.

In the power superposition circuit (50), the direct-current power source (DC) is connected to the positive side signal line (2a) and the negative side signal line (2b) of the communication line (20) through power source lines (23, 23), the discharge resistors (R1, R2) and a capacitor (C1), thereby forming a power superposition means. The direct-current power source (DC) applies a direct-current-voltage of a set value, for example, +16V to the positive side signal line (2a) and the negative side signal line (2b) so that the polarity of the communication line (20) can be determined.

The power source lines (23, 23) are provided with respective relay switches (Ry1-1, Ry1-2). The relay switches (Ry1-1, Ry1-2) form a power supply switch (51) which connects and disconnects the direct-current power source (DC) and the communication line (20) based on a control signal from the MPU (40).

Further, the discharge resistors (R1, R2) are disposed on the direct-current power source (DC) side from the relay switches (Ry1-1, Ry1-2) of the power source lines (23, 23). The capacitor (C1) is connected in parallel to the direct-current power source (DC) between both the power source lines (23, 23). Both the discharge resistors (R1, R2) are connected in series through the capacitor (C1).

The capacitor (C1) is set to a capacitance such that a capacitive reactance to the frequency of a signal transmitted in the communication line (20) is sufficiently small as compared with resistance values of the discharge resistors (R1, R2). As a result, an impedance seen from the communication line (20) is equivalent to that which the two resistors are connected, so that the discharge resistors (R1, R2) perform.

Configuration of Polarity Select Circuit (60)

Figure 4:
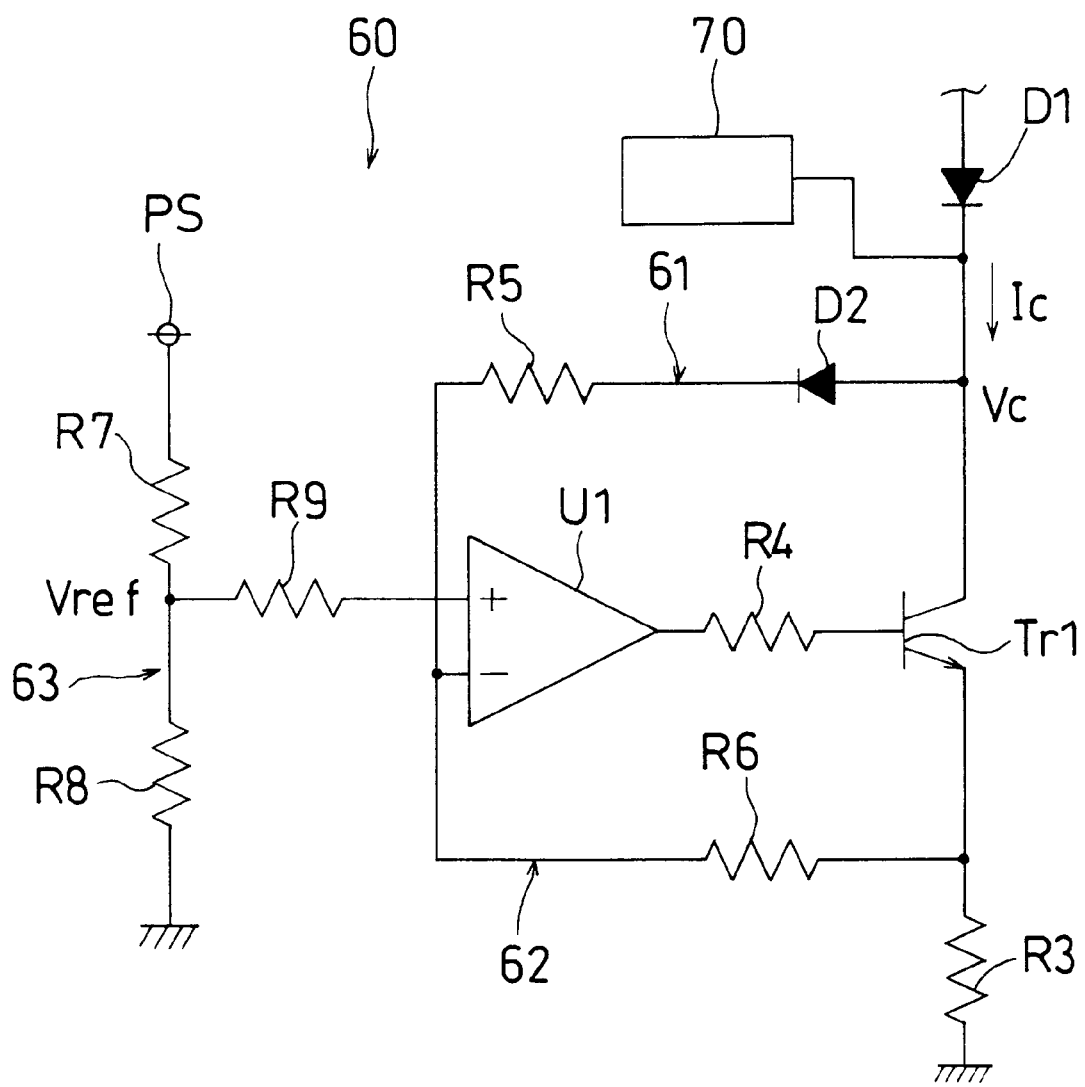
FIG. 4 is a circuit diagram of a polarity select circuit.

As shown in FIG. 4, the polarity select circuit (60) as one of the features of this invention is connected to the negative side power source line (23) and is connected in series to the direct-current power source (DC), thereby forming a polarity select means.

The polarity select circuit (60) has a transistor (Tr1) connected to the power source line (23) through a diode (D1). The emitter of the transistor (Tr1) is connected to the ground through a resistor (R3), and the base thereof is connected to an amplifier (U1) through a resistor (R4). The diode (D1) is provided for protecting the transistor (Tr1) from noise, an inversely applied voltage and the like.

An inverse side input of the amplifier (U1) is connected to a positive feedback circuit (61) toward the collector of the transistor (Tr1) and is connected to a negative feedback circuit (62) toward the emitter of the transistor (Tr1). The positive feedback circuit (61) has a diode (D2) and a resistor (R5) while the negative feedback circuit (62) has a resistor (R6).

A non-inverse side input of the amplifier (U1) is connected, through a resistor (R9), to a reference voltage line (63) in which a power source (PS) and two resistors (R7, R8) are connected in series.

Figure 5:
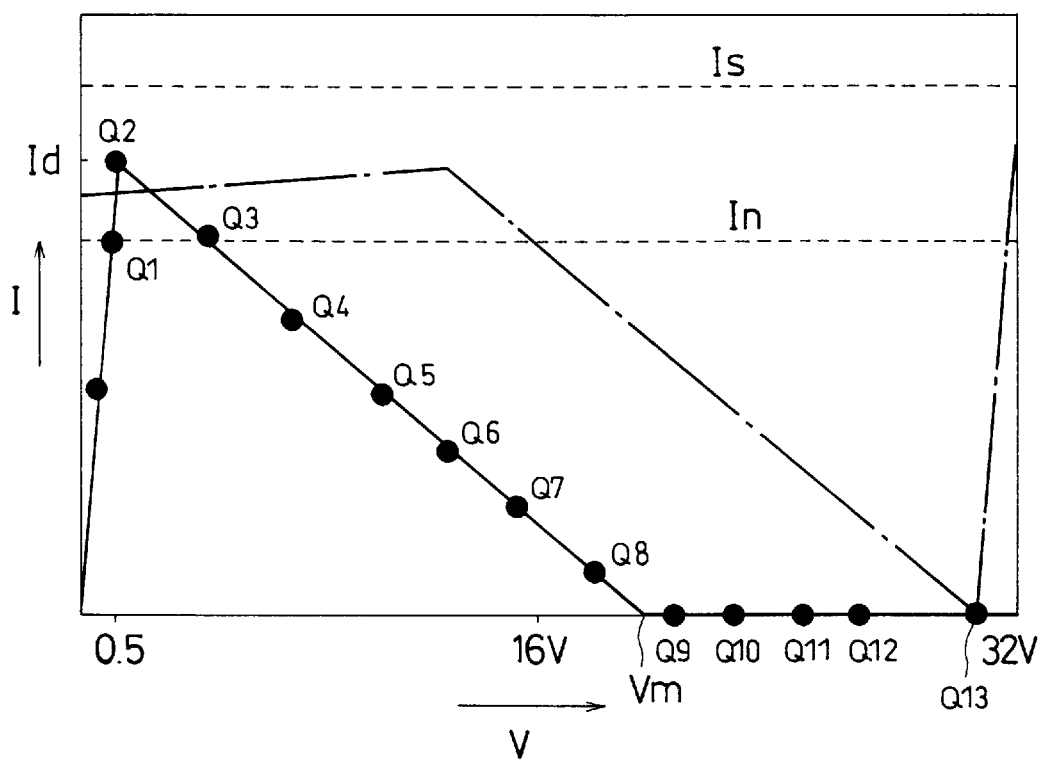
FIG. 5 is a diagram showing a negative-polarity characteristic of the polarity select circuit.

The polarity select circuit (60) is formed, as shown in FIG. 5, so as to exhibit a negative-polarity resistance characteristic in the form of a saw blade by the positive feedback circuit (61).

In detail, by positively feeding back an applied voltage Vc of the collector of the transistor (Tr1), the above negative-polarity resistance characteristic is obtained (operating points Q2 to Vm). Current Ic flowing through the transistor (Tr1) is found from the following formula:

$$Ic = \{Vref \times (R5+R6) - Vc \times R6\}/(R3 \times R5) \tag{1}$$

In the above formula (1), Vref is a reference voltage between the two resistors (R7, R8) in the reference voltage line. When the voltage of the power source (PS) is 5V, Vref is found from the following formula:

$$Vref = (5 \times R8)/(R7+R8) \tag{2}$$

The diode (D2) prohibits a positive feedback when the applied voltage Vc is less than the reference voltage Vref (Vc<Vref).

Further, the voltage Vm corresponding to a minimum current value based on the negative-polarity resistance characteristic is set larger than the voltage value (16V) of the direct-current power source (DC).

A set current value Id as a maximum current value at the peak point of the negative-polarity resistance characteristic is set by the negative feedback circuit (62) and is found from the following formula.

$$Id \approx Vref/R3 \tag{3}$$

Further, the voltage value at the peak point of the negative-polarity resistance characteristic is set to 0.5V equal to the reference voltage Vref. An inclination from a starting point to the peak point of the negative-polarity resistance characteristic diagram is decided by the characteristic of the resistor (R3). In this region, the amplifier (U1) performs a comparator-like operation.

The set current value Id is set smaller than a minimum overcurrent value Is and larger than a maximum load current value In.

Figure 6:
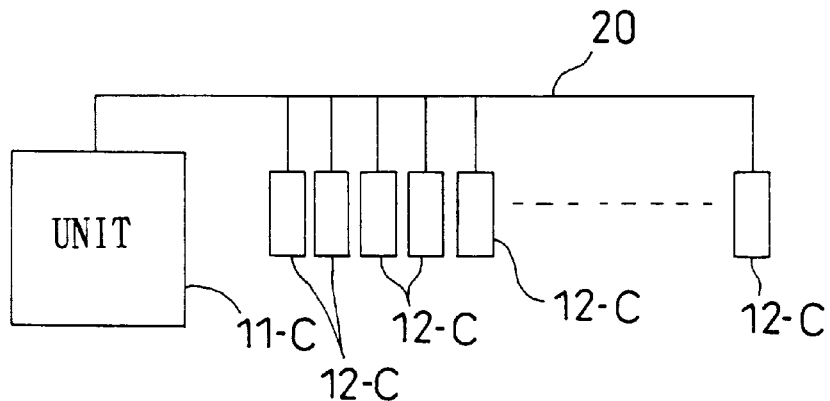
FIG. 6 is a current state diagram of an air conditioner in a same polarity state.
Figure 7:
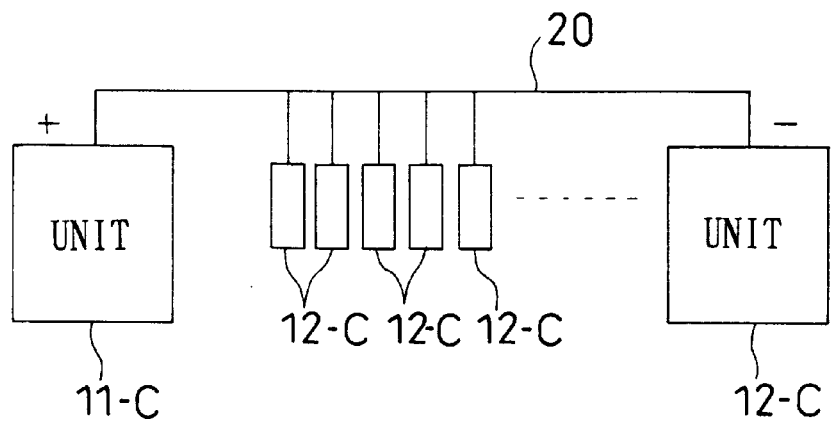
FIG. 7 is a current state diagram of an air conditioner in a different polarity state.

As shown in FIG. 6, the maximum load current value In is a maximum current value of current flowing through the communication line (20) when a direct-current voltage is applied to the communication line (20) from one power superposition circuit (50) of, for example, an output control unit (11-C). As shown in FIG. 7, the minimum overcurrent value Is is a minimum overcurrent value of current flowing through the communication line (20) when the power superposition circuits (50, 50, ...) of, for example, outdoor control units (11-C) are connected, at opposite polarity, to the communication line (20).

Figure 8:
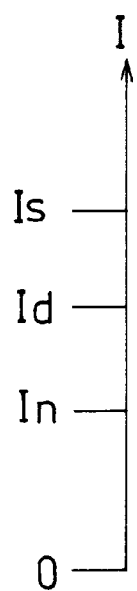
FIG. 8 is an explanatory diagram showing set current values of a polarity select circuit.

As shown in FIG. 8, the minimum overcurrent value Is is set larger than the maximum load current value In (Is>In). The set current value Id is set between the minimum overcurrent value Is and the maximum load current value In.

Characteristic of Polarity Select Circuit (60)

Description is made next about a characteristic of the polarity select circuit (60).

Figure 9:
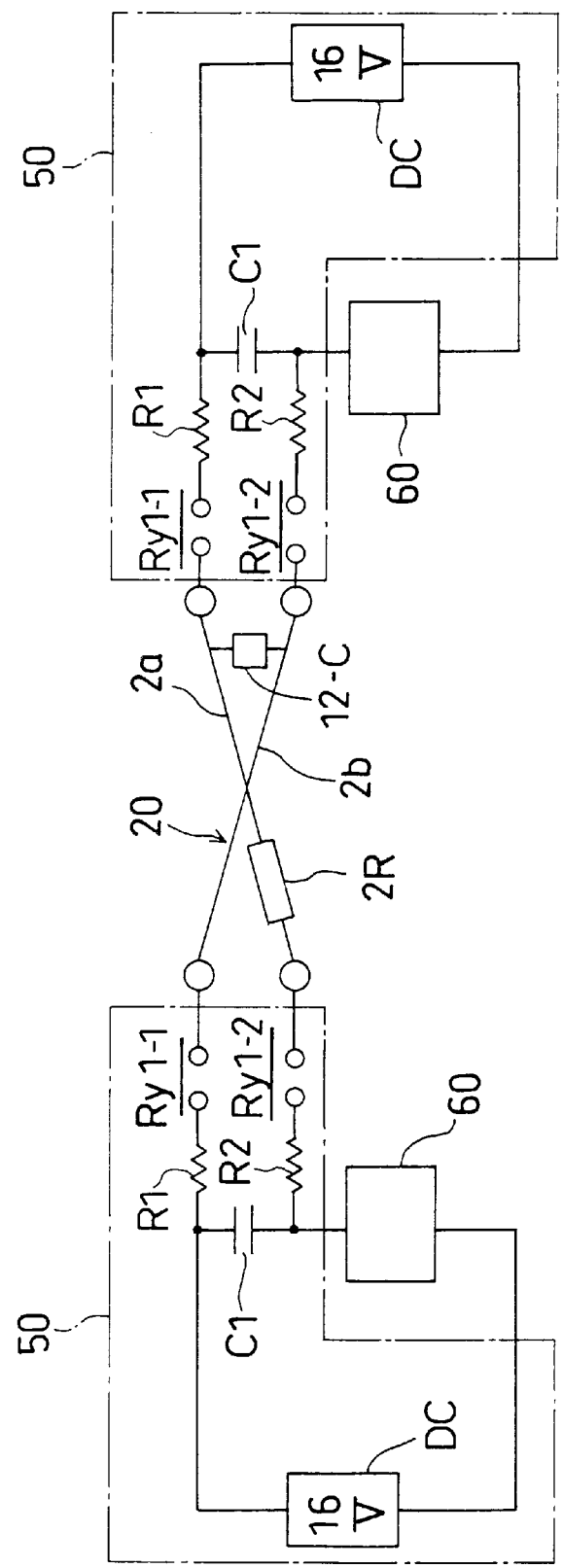
FIG. 9 is a control system diagram for explanation of characteristics of the polarity select circuit.

As shown in a schematic diagram of FIG. 9, suppose that direct-current power sources (DC, DC) of the power superposition circuits (50, 50) of two outdoor control units (11-C) are connected, at opposite polarity, to the communication line (20). In this state, when the relay switches (Ry1-1, Ry1-2) are switched on so that direct-current voltages are applied to the communication line (20) in two ways, both the applied voltage values are not equal to each other. Since a line resistor (R2) of the communication line (20) and the like exist between two polarity select circuits (60, 60), different voltages are applied to the communication line.

Due to the difference between applied voltages, one polarity select circuit (60) makes an applied voltage of the operating point smaller to supply a greater amount of current, whereas the other polarity select circuit (60) makes an applied voltage of the operating point larger to limit an amount of current, because the two direct-current power sources (DC, DC) are connected in series and therefore current flowing through the entire circuit is constant. That is, two applied voltages of the two polarity select circuits (60) have an exclusive relationship.

More specifically, for example, when voltages of Q5 and Q7 are applied to the two polarity select circuits (60, 60) respectively, the operating point of one polarity select circuit (60) shifts from Q5 to Q4, Q3, Q2, Q1 in order, while the operating point of the other polarity select circuit (60) shifts from Q7 to Q8, Q9, . . . , Q13 in order.

As shown in FIG. 5, stable points among the operating points of the two polarity select circuits (60, 60) are intersecting points between the negative-polarity resistance characteristic of one polarity select circuit (60) and a load line of the other polarity select circuit (60). Three intersecting points exist. However, since the stable point shifts to a lower voltage point on the lower voltage side, the practical operating point of one polarity select circuit (60) is Q1 and the operating point of the other polarity select circuit (60) is Q13.

As a result, the terminal voltage of the polarity select circuit (60) having the operating point of Q1 is 0V, whereas the terminal voltage of the polarity select circuit (60) having the operating point of Q13 is 32V. Accordingly, the direct-current voltage of the polarity select circuit (60) of a 0V terminal voltage has the same polarity as the communication line (20), whereas the direct-current voltage of the polarity select circuit (60) of a 32V terminal voltage is different in polarity from the communication line (20).

Configuration of Voltage Discriminating Circuit (70)

Figure 10:
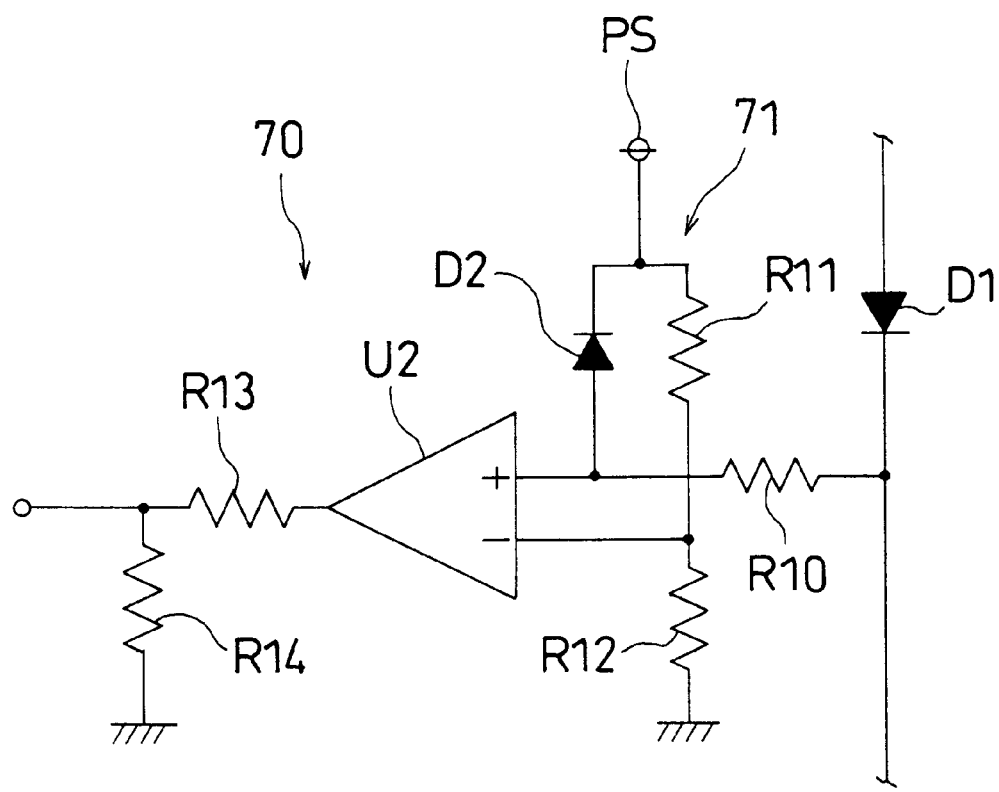
FIG. 10 is a circuit diagram of a voltage discriminating circuit.

As shown in FIG. 10, the voltage discriminating circuit (70) is connected between the diode (D1) of the polarity select circuit (60) and the transistor (Tr1), thereby forming a voltage discriminating means for detecting the terminal voltage of the polarity select circuit (60).

The voltage discriminating circuit (70) has a comparator (U2) connected at the non-inverse side input to the polarity select circuit (60) through a resistor (R10). The non-inverse side input of the comparator (U2) is connected to a reference voltage line (71) in which a power source (PS) and two resistors (R11, R12) are connected in series. The non-inverse side input of the comparator (U2) is connected to the power source (PS) through a diode (D2).

The output of the comprator (U2) is connected to the MPU (40) through a resistor (R13) and is connected to the ground through a resistor (R14). The comparator (U2) outputs to the MP (40) a low-voltage signal when the terminal voltage of the polarity select circuit (60) is a set voltage or less, and outputs to the MPU (40) a high-voltage signal when the terminal voltage of the polarity select circuit (60) is above the set voltage. In detail, when the terminal voltage of the polarity select circuit (60) is 1V or less, the comparator (U2) outputs a low-voltage signal to inform the MPU (40) that its own polarity is selected as a result of competition in polarity between the communication line (20) and the direct-current power source (DC). On the contrary, when the terminal voltage of the polarity select circuit (60) is above 1V, the comparator (U2) outputs a high-voltage signal to inform the MPU (40) that its own polarity is not selected as a result of competition in polarity between the communication line (20) and the direct-current power source (DC).

Configuration of Other Components in MPU (40)

The MPU (40) is provided with a number output means (41) and a master/slave unit determining means (42).

The number output means (41) opens and shuts the relay switches (Ry1-1, Ry1-2) of the power superposition circuit (50) and outputs a serial number as a unit number of its own outdoor control unit to the communication line (20). In detail, the serial number such as a product number is pre-assigned to each of the outdoor control units (11-C, 11-C, . . . ). The serial numbers are assigned as different unit numbers to every outdoor control units (11-C, 11-C, . . . ).

The number output means (41) opens and shuts the relay switches (Ry1-1, Ry1-2) of the power superposition means (50), base-band modulates a direct-current voltage superposing in the communication line (20) and outputs a binary identification number signal based on the serial number to the communication line (20).

Further, as shown in FIG. 11, the number output means (41) adds a low-voltage level verification signal LAST after the serial number.

The master/slave unit determining means (42) determines whether its own unit is a master unit which applies a direct-current voltage to the communication line (20) and connects the discharge resistors (R1, R2) to the communication line (20) or a slave unit which applies no direct-current voltage to the communication line (20) and does not connect the discharge resistors (R1, R2) to the communication line (20). In other words, the master/slave unit determining means (42) determines whether its own unit is a master unit which flips on the relay switches (Ry1-1, Ry1-2) when control information is transmitted at the time of air conditioning or a slave unit which flips off the relay switches (Ry1-1, Ry1-2) when control information is transmitted at the time of air conditioning.

When a direct-current voltage is applied to the communication line (20), the light emitting diodes (LED1, LED2) of the polarity discriminating circuit (3C) turn the phototransistors (PHT1, PHT2) on, and the polarity discriminating circuit (3C) outputs to the MPU (40) a low-level voltage signal as a polarity signal indicating a same polarity signal or a different polarity signal. When no direct-current voltage is applied to the communication line (20), the phototransistors (PHT1, PHT2) remains off and the polarity discriminating circuit (3C) outputs to the MPU (40) a high-level voltage signal including neither a same polarity signal nor a different polarity signal. When an identification number signal of its own unit is outputted to the communication line (20) by the number output means (41), the master/slave unit determining means (42) determines whether its own unit is a master unit or a slave unit based on an output signal from the polarity discriminating circuit (3C) in the CSMA/CD (carrier sense multiple access with collision detection) mode, and determines whether its own unit is a master unit or a slave unit based on a low-level voltage signal or a high-level voltage signal from the voltage discriminating circuit (70).

More specifically, the master/slave unit determining means (42) determines that its own unit is a slave unit when the voltage discriminating circuit (70) outputs a high-voltage signal in outputting a high-voltage bit of an identification number signal of its own unit. The master/slave unit determining means (42) also determines that its own unit is a slave unit when the polarity discriminating circuit (3C) detects a high-level voltage of the communication line (20) in outputting a low-voltage bit of an identification number signal of its own unit, because another outdoor control unit (11-C, 11-C, ...) outputs an identification number signal of the control unit.

The master/slave unit determining means (42) determines that its own unit is a master unit when the voltage discriminating circuit (70) outputs a low-voltage signal and the entire identification number signal of its own unit. Thereby, a single master unit in the air conditioner (10) is determined.

Figures 11A, 11B, 11C:
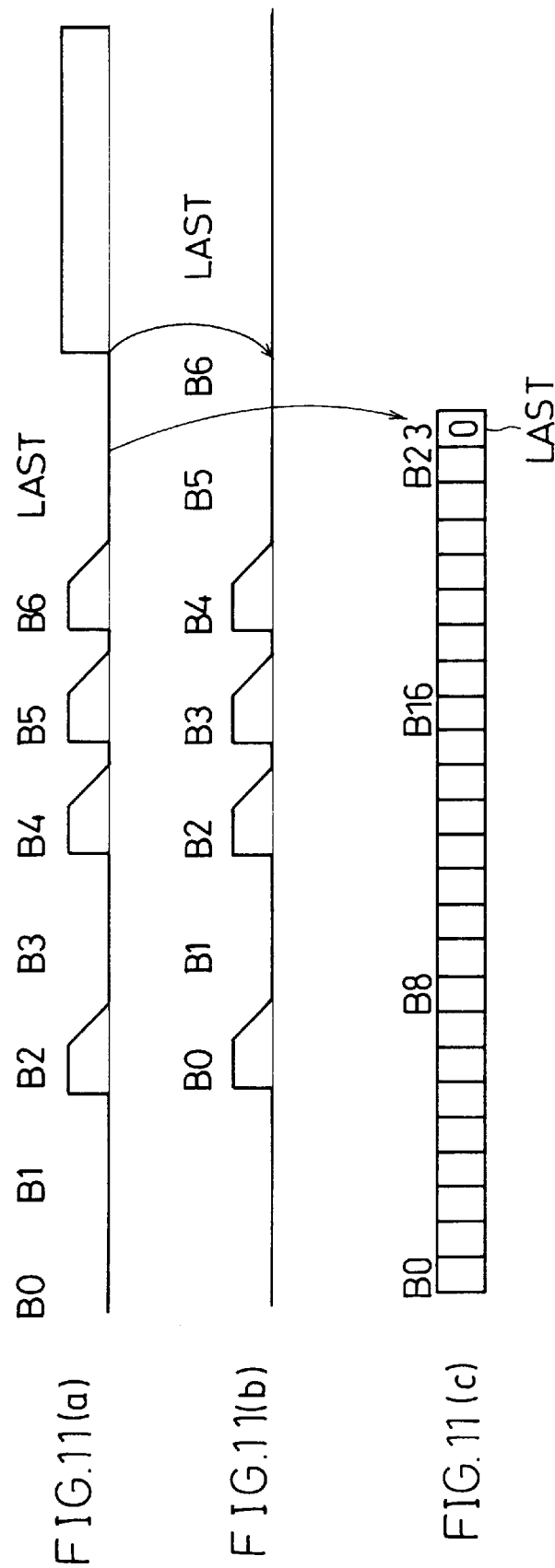
FIGS. 11(a), (b) and (c) is a signal waveform diagram showing the state that identification number signals are shifted to each other.

In particular, as shown in FIG. 11, when identification number signals of the outdoor control units (11-C, 11-C, ...) are different in position from each other by one bit or more, the number output means (41) outputs a serial number and then outputs a verification signal LAST. Thus, when the polarity discriminating circuit (3C) outputs a high-level voltage signal as a polarity signal in outputting a verification signal LAST (See "LAST" in FIG. 11(b)), the master/slave unit determining means (42) determines that its own unit is a slave unit.

As shown in FIG. 11(c), a verification signal LAST of "0" is added after a serial number by the number output means (41).

As shown in FIG. 3, the forced discharge circuit (80) forms a forced discharge means for discharging charges of the communication line (20), charges in interface parts of the units connected to the communication line (20) immediately after the number output means (41) outputs a high-voltage bit of an identification number signal of its own unit.

More specifically, the forced discharge circuit (80) has a transistor (Tr2), a resistor (R15) and a diode (D3) each connected in parallel to the capacitor (C1) of the power superposition circuit (50). The base of the transistor (Tr2) is connected to the direct-current power source (DC) through a resistor (R16) and to another transistor (Tr3) through a resistor (R17). The transistor (Tr3) is connected at the base to the MPU (40) through a resistor (R18) and inputs a forcedly discharging signal.

When a high-voltage bit of an identification number signal is outputted to the communication line (20), it takes several ten seconds for voltage to drop by natural discharge t2 after a voltage output t1, as shown in FIG. 12(a). To solve the problem, as shown in FIG. 12(b), the forced discharge circuit (80) conducts forced discharge t3 thereby reducing a transmission period of time. At the time, as shown in FIG. 12(c), when another outdoor control unit (11-C, 11-C, ...) outputs a voltage, the master/slave unit determining means (42) may determines that its own unit is a slave unit. However, it produces no problem because it is essential only to determine a single master unit.

The MPU (40) is provided with a master unit declaration means (43) and a determination change means (44). The master unit declaration means (43) outputs a master unit declaration signal to the communication line (20) when the master/slave unit determining means (42) determines that its own unit is a master unit.

The determination change means (44) receives a master unit declaration signal from another outdoor control unit (11-C), compares the serial number of the other outdoor control unit (11-C) with that of its own unit, and changes the master unit determined by the master/slave unit determining means (42) to a slave unit when the serial number of the other outdoor control unit (11-C) is larger.

More specifically, the above operation is for setting a single master unit in the communication line (20). Therefore, when two or more master units exist for some reason, a single master unit must be determined. At the time, since the above maser unit have been set and signal transmission is possible in the AMI communication method even if two or more maser units are determined, the maser unit declaration signal is outputted from the transmission circuit (3A) to the communication line (20).

The MPU (40) is further provided with a state recognizing means (45) and a restart means (46). The state recognizing means (45) recognizes an unsteady state in polarity of the communication line (20) due to noise and the like.

The restart means (46) restarts operations of the number output means (41) and the master/slave unit determining means (42) so as to activate an operation of determining to be a master unit or a slave unit, when the state recognizing means (45) recognizes an unsteady state in polarity.

In other words, when the outdoor control unit (11-C) determined to be a master unit causes a malfunction in the discharge resistors (R1, R2), another outdoor control unit (11-C) is determined to be a new master unit.

The MPU (40) is also provided with an initializing means (47). The initializing means (47) applies a set voltage to the polarity select circuit (60) so that the initial operating point of the polarity select circuit (60) may have a specific voltage value.

More specifically, as shown in FIG. 9 mentioned above, when two polarity select circuits (60) operate and the relay switches (Ry1-1, Ry1-2) are turned on, a voltage is applied by the direct-current power source (DC) and the terminal voltage of each polarity select circuit (60) then rises until the voltage of the communication line (20) is balanced.

Figure 13:
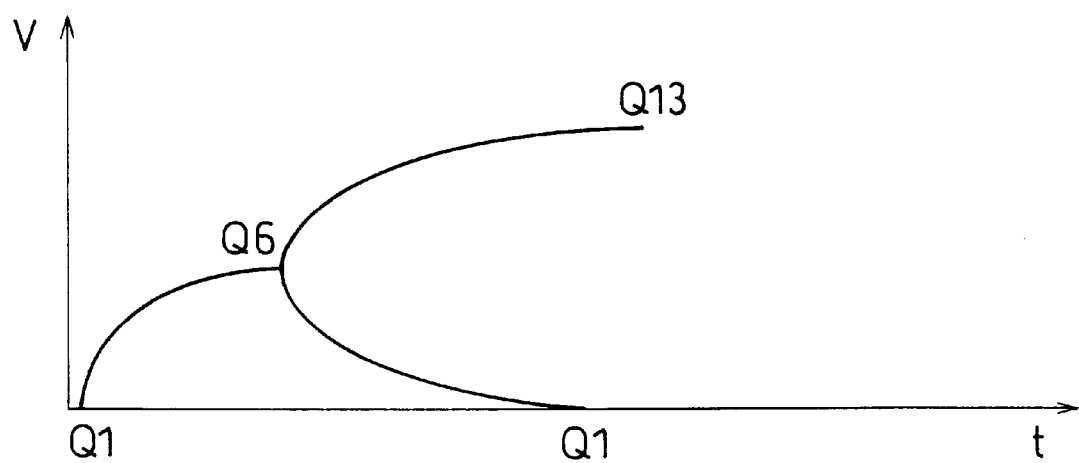
FIG. 13 is a voltage characteristic diagram showing transitions of an operating point in the polarity select circuit.

Accordingly, as shown in FIG. 13, the terminal voltage of each polarity select circuit (60) starts to rise at Q1 and rises to Q6 owing to the line resistor (2R) and the like, and thereafter the operating points of the polarity select circuit (60) shift to Q1 and Q13 as mentioned above.

The initializing means (47) turns on the transistor (Tr2) of the forced discharge circuit (80) to conduct forced discharge and directly applies a voltage from the direct-current power source (DC) to the polarity select circuit (60) so that the terminal voltage of the polarity select circuit (60) becomes Q6 at the initial operating point, thereby reducing a time for polarity selection operation.

Master Unit Determining Operation

Figure 14:
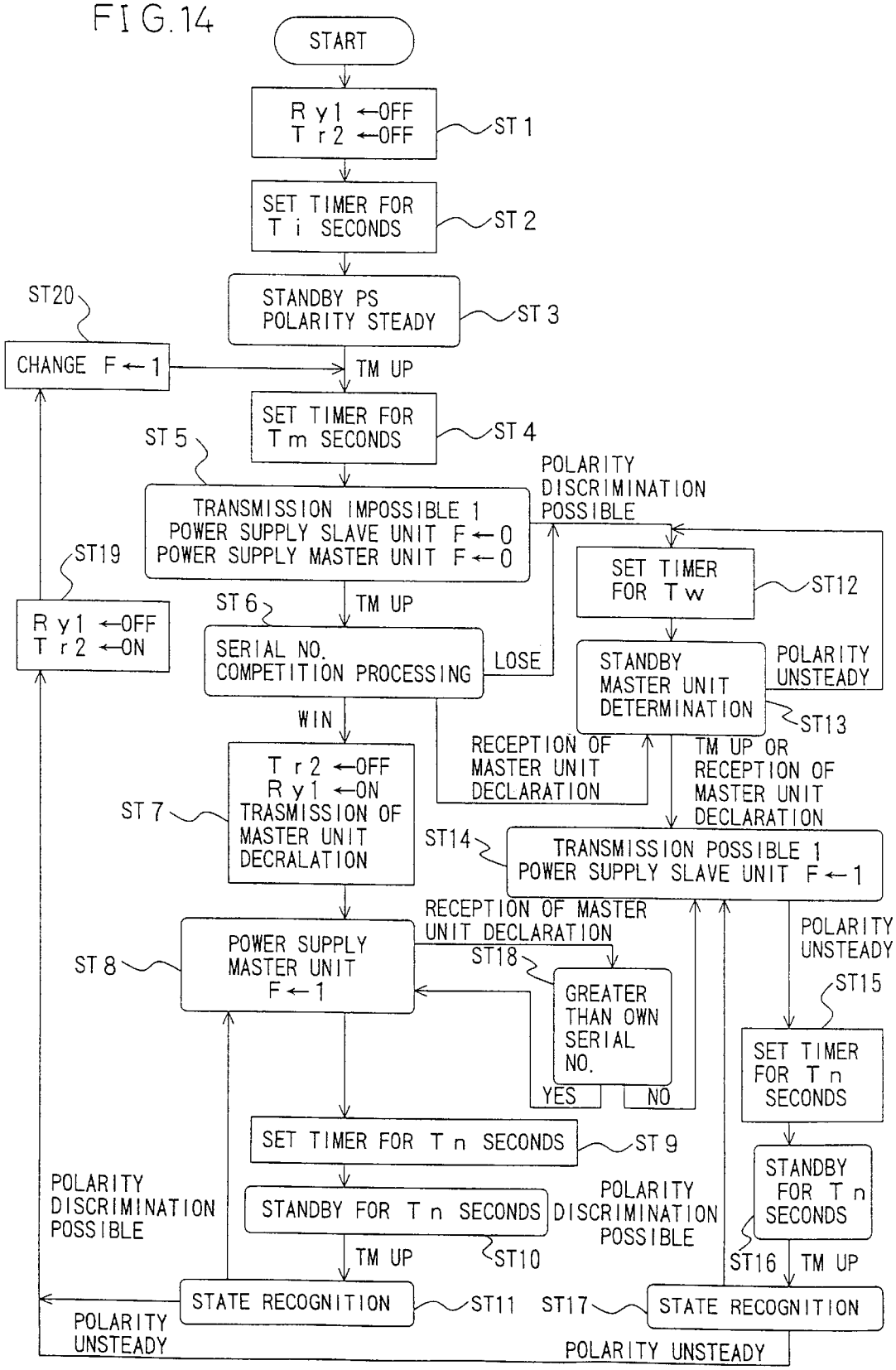
FIG. 14 is a control flow chart showing an operation of determining whether to be a master unit or a slave unit.
Figure 15:
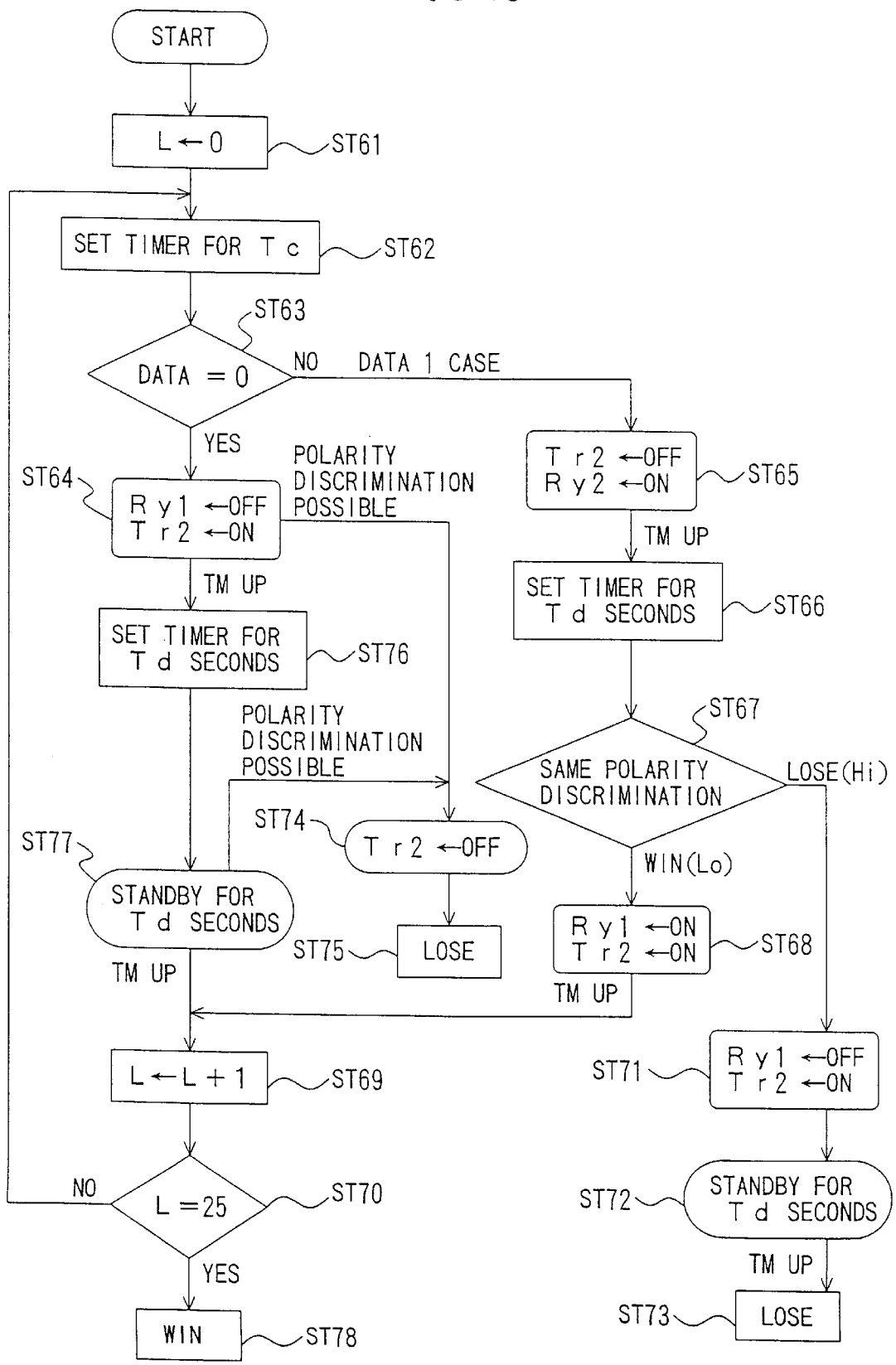
FIG. 15 is a control flow chart showing a polarity discrimination.

Next, description is made about a master unit determining operation in the air conditioner (10) with reference to control flowcharts of FIGS. 14 and 15.

FIG. 14 shows a main routine for master unit determining operation and FIG. 15 shows a subroutine when outputs of serial numbers are competed with each other.

When a main switch of the air conditioner (10) is turned on and the master unit determining operation of FIG. 14 starts, the program proceeds to step ST1, turns off the relay switches (Ry1-1, Ry1-2) of the power superposition circuit (50), and turns off both the transistors (Tr2, Tr3) of the forced discharge circuit (80). That is, the program executes an initializing operation to stop power supply from the direct-current power source (DV) and stop forced discharge.

In both the transistors (Tr2, Tr3) of the forced discharge circuit (80), the transistor (Tr2) turns on when the transistor (Tr3) turns on, and the transistor (Tr2) turns off when the transistor (Tr3) turns off. Therefore, description is made below only about the on- and off-operations of the transistor (Tr2).

Then, the program proceeds to step ST2, sets a timer for Ti seconds and then proceeds to step ST3. At the step, the program determines whether the timer counts to Ti and stands by until the set time passes.

In detail, when charges are left in an interface part of the unit connected to the communication line (20), the outdoor control units (11-C, 11-C, . . . ) are programmed to be determined to be slave units. Accordingly, charges in the communication line (20) are discharged and the program stands by until the communication line (20) becomes steady.

The program proceeds to step ST4, sets the timer for Tm seconds and proceeds to step ST5. At the step, the program determines whether transmission is possible. In detail, the program determines whether the polarity discriminating circuit (3C) outputs a high-level voltage signal as a polarity signal or outputs a low-level voltage signal including no polarity signal. Then, the program resets a master unit flag and a slave unit flag.

Here, description is made about the normal case that the voltage of the communication line (20) drops, from the state that the polarity discriminating circuit (3C) outputs a high-level voltage signal including no polarity signal.

In this case, the program proceeds from step ST5 to step ST6 and executes a competition processing with the use of serial numbers, which is the most significant feature of this invention. Since this processing is made as shown in FIG. 15 and requires to determine results of competitions, the competition processing is first described.

The communication line (20) is connected to the outdoor control units (11-C, 11-C, . . . ), the indoor control units (12-C, 12-C, . . . ) and the centralized controller (14). Now, as shown in step ST5, these units are not determined to be a master unit or a slave unit. In this state, the number output means (41) of respective outdoor control units (11-C, 11-C, . . . ) output respective identification number signals and the identification number signals are competed with each other in the communication line (20).

At step ST61, the number output means (41) of respective outdoor control units (11-C, 11-C, . . . ) each set a bit counter to 0 bit. In detail, since different serial numbers are pre-assigned to respective outdoor control units (11-C, 11-C, . . . ), the respective number output means (41) set the bit counters to 0 bit in order to output identification number signals from their least significant bits.

Then, the program proceeds to step ST62, set the timer for Tc seconds for charging. The program then proceeds to step ST63 and determines whether data is "0". In detail, whether the least significant bit of the identification number signal is "0" is determined. When the bit indicated by the bit counter is "0", that is, when the least significant bit is "0" at the present state, the program proceeds from step ST63 to step ST64. At the step, the program turns on the transistor (Tr2) of the forced discharge circuit (80) while keeping the relay switches (Ry1-1, Ry1-2) of the power superposition circuit (50) off, and discharges charges of the capacitor (C1) of the power superposition circuit (50) for preparation of the next transmission.

On the other hand, when the bit indicated by the bit counter is "1", that is, when the least significant bit is "1" at the present state, the program proceeds from step ST63 to step ST65. At the step, the transistor (Tr2) of the forced discharge circuit (80) is turned off, the relay switches Ry1-1, Ry1-2) of the power superposition circuit (50) are turned on, and data "1" is outputted.

When the data "1" is outputted, the program stands by until the timer counts to Tc seconds and then proceeds to step ST66. At the step, the program sets the timer for Td seconds, then proceeds to step ST67 and determines whether a subject unit wins or loses in polarity selection.

Figure 16:
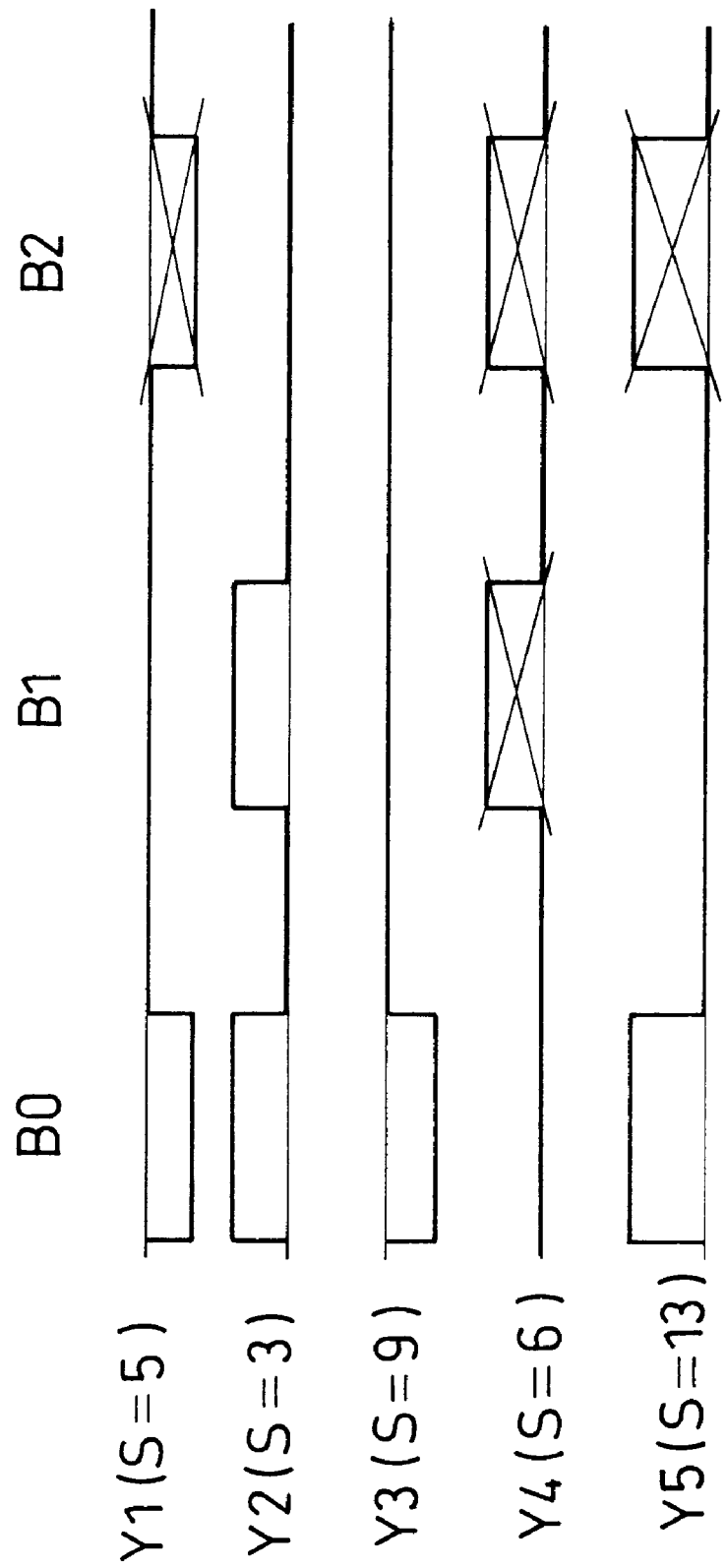
FIG. 16 is a signal waveform diagram showing an operation of determining whether to be a master unit or a slave unit.

Detailed description is made about the polarity discrimination. As shown in FIG. 16, for example, five units Y1–Y5 as outdoor control units (11-C, 11-C, . . . ) output respective identification number signals to the communication line (20). The serial number of the unit Y1 is assigned to 5, the serial number of the unit Y2 is assigned to 3, the serial number of the unit Y3 is assigned to 9, the serial number of the unit Y4 is assigned to 6 and the serial number of the unit Y5 is assigned to 13. Bit B3 and later are omitted.

FIG. 16 shows polarities of identification number signals outputted from the respective units Y1–Y5 and seen from the communication line (20). The strait line of FIG. 16 is a 0V line. As seen from FIG. 16, the units Y1 and Y3 in which their identification number signals are outputted below the 0V line are connected opposite in polarity to the communication line (20).

In this state, the unit Y4 of serial number 6 proceeds from step ST63 to step ST64, and other units Y1, Y2, Y3 and Y5 proceed from step ST63 to step ST65. Suppose that the units Y1 and Y3 are connected opposite in polarity to the communication line (20) and the units Y2 and Y5 are connected to the communication line (20) in same polarity.

When the relay switches (Ry1-l, Ry1-2) of each power superposition circuit (50) of the four units Y1, Y2, Y3 and Y5 are turned on, as shown in FIGS. 5 and 9, the operating points of the polarity select circuits (60) of the units Y2 and Y5 come to Q1 so that the terminal voltages of the polarity select circuits (60) drop. On the other hand, the operating points of the polarity select circuits (60) of the units Y1 and Y3 come to Q13 so that the terminal voltages of the polarity select circuits (60) rise. The polarity discrimination may be opposite. However, in this embodiment, it is supposed that the polarity of the units Y2 and Y5 is selected.

As a result, the voltage discriminating circuits (70) of the units Y2 and Y5 output low-voltage signals so that the master/slave unit determining means (42) determines these units win in polarity discrimination. The voltage discriminating circuits (70) of the units Y1 and Y3 output high-voltage signals so that the master/slave unit determining means (42) determines these units lose in polarity discrimination.

At step ST65, though it is not shown, the initializing means (47) turns on the transistor (Tr2) of the forced discharge circuit (80), applies a voltage from the direct-current power source (DC) to the polarity select circuit (60), thereby setting the initial operating point of each polarity select circuit (60) to Q6 of FIG. 13.

Thereafter, when determining the subject unit wins in polarity discrimination, the program proceeds from step ST67 to step ST68. In FIG. 16, the units Y2 and Y5 are determined to win in polarity discrimination. Then, with the relay switches (Ry1-1, Ry1-2) kept in an ON state, the forced discharge circuit (80) turns on the transistor (Tr2) to discharge charges left in the interface part of the unit connected to the communication line (20).

Then, the program stands by until the timer counts to Tc seconds and proceeds from step ST68 to step ST69. At the step, the program adds 1 to the bit counter, proceeds to step ST70 and determines whether the bit counter counts to 25.

In detail, whether the bit counter comes to the most significant bit of the identification number signal is determined. Until the entire identification number signal is outputted, the determination at step ST70 is NO and the program returns to step ST62 and outputs the next bit.

On the other hand, when determining the subject unit loses in polarity discrimination, the program proceeds from step ST67 to step ST71, determines that the units Y1 and Y3 lose in polarity discrimination as shown in FIG. 16, and turns off the relay switches (Ry1-1, Ry1-2), and the forced discharge circuit (80) turns off the transistor (Tr2) to shut off unnecessary circuit current.

Next, the program proceeds to step ST72, stands by that the timer counts to Tc seconds and then proceeds to step ST72. At the step, the master/slave unit determining means (42) determines its own unit loses in polarity discrimination and the program returns to the main routine of FIG. 14. In FIG. 16, the units Y1 and Y3 output no identification number signal afterward.

When the data "0" is outputted and at step ST64 the polarity discrimination is possible, the program proceeds to step ST74 and turns off the transistor (Tr2) of the forced discharge circuit (80). Then, the program proceeds to step ST75 and the master/slave unit determines that its own unit loses in polarity discrimination.

In FIG. 16, while the unit Y4 outputs data "0", other units Y2 and the like output data "1". Accordingly, the voltage of the communication line (20) becomes a high level so that the polarity discriminating circuit (3C) of the unit Y4 outputs a high-level voltage signal. As a result, the master/slave unit determining means (42) determines its own unit loses in polarity discrimination and the program then returns to the main routine of FIG. 14. Thereafter, the unit Y4 of FIG. 16 outputs no identification number signal afterward.

When the data "0" is outputted and at the step ST64 all the outdoor control units (11-C, 11-C, . . . ) output data "0", if the timer counts to Tc seconds, the program proceeds to step ST76 and sets the timer for Td seconds. Then, the program proceeds to step ST77 and stands by until the timer count to Td seconds.

At the time of standby, when the voltage of the communication line (20) becomes a high level, another outdoor control unit (11-C) may output an identification number signal. Therefore, the program proceeds to step ST74 and the master/slave unit determining means (42) determines its own unit loses in polarity discrimination as mentioned above, and then the program returns to the main routine of FIG. 14.

When the timer counts up to Td seconds at step ST77, the program proceeds to ST69, increments the bit counter and repeats the above operation. In detail, second bit data is outputted and the unit Y2 outputs data "1" in FIG. 16. Therefore, the unit Y5 executes the operations of steps ST64, ST74 and ST75 and the program then determines the subject unit loses in polarity discrimination.

When the entire identification number signal Is outputted, the program moves from step ST70 to step ST78 and the master/slave unit determining means (42) determines its own unit wins in polarity discrimination. That is, the unit Y2 wins in FIG. 16.

Thus, in FIG. 15, the unit outputting data "1" based on the serial number survives with higher priority and loses when the first bit has a different polarity. Thereby, only one unit survives.

Figure 17:
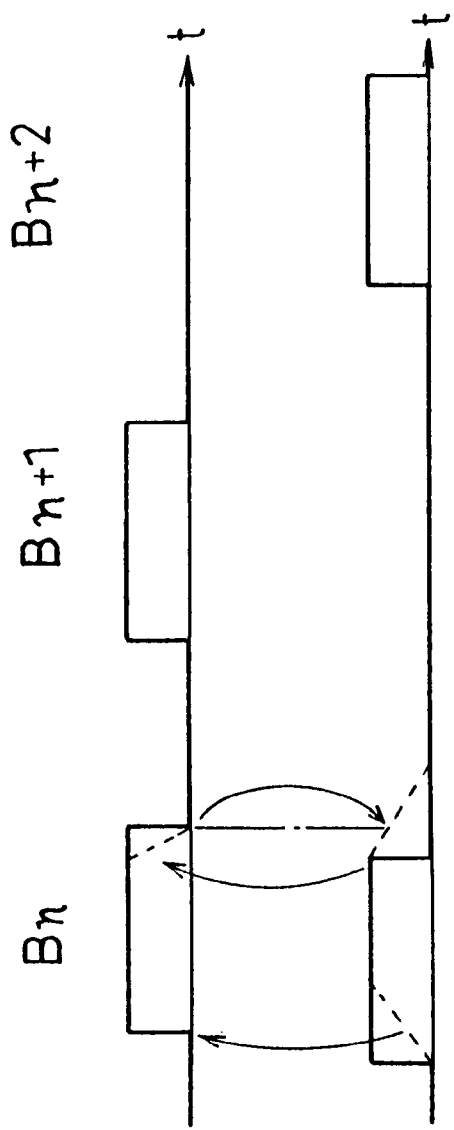
FIG. 17 is a signal waveform diagram showing another operation of determining to be a master unit or a slave unit.

Next, in the processing of FIG. 15, for example, when two units Y2 and Y5 output data "1" with a difference in position by 1 bit or less as shown in FIG. 17, both the units Y2 and Y5 first win and are then determined, based on the next bit, about whether to win or lose in polarity discrimination.

In detail, description is made about the case that a difference in position by 1 bit or less occurs between the units Y2 and Y5, the unit Y5 outputs data before the unit Y2 does and the data of the unit Y5 does not grow dull (see the solid line of FIG. 17).

In this case, when the data Bn of the unit Y2 is located at the 0-order digit, the unit Y2 proceeds from step ST6 of FIG. 14 to step ST12 and step ST13 and stands by until a master unit is decided.

When the data Bn of the unit Y2 is located at the first order or higher digit and the data Bn−1 of the precedent order digit is "0", the unit Y2 proceeds from step ST64 to step ST74 and step ST75 and determination is made that the unit loses in polarity discrimination.

When the data Bn of the unit Y2 is located at the first order or higher digit and the next-order digit data Bn+1 is "1", the unit Y2 proceeds from step ST65 to step ST66 and step ST67. It is determined that the unit Y2 loses in polarity discrimination since the unit Y5 starts discharging prior to the unit Y2. Alternatively, it is determined that the unit Y2 wins in polarity discrimination because of its number of connected units and its connection length and the unit Y2 proceeds to step ST68.

On the other hand, there is the case that a difference in position by 1 bit or less is made between the units Y2 and Y5, the unit Y5 outputs data prior to the unit Y2 and the data of the unit Y5 grows dull (see the broken line of FIG. 17). In this case, the data of the unit Y5 may not be detected though it outputs data prior to the unit Y2.

In such a case, when the data Bn of the unit Y2 is located at the 0-order digit, the unit Y2 fundamentally proceeds from step ST4 to step ST5 in FIG. 14. In some instances, by discharge of the unit Y5 (step ST68), the unit Y2 may proceed to step ST71 of a competition processing of FIG. 15.

When the data Bn of the unit Y2 is located at the first order or higher digit and the precedent digit data Bn−1 is "0", the unit Y2 proceeds from step ST64 to step ST74 and step ST75 and it is determined that the unit Y2 loses in polarity discrimination, as in the above-mentioned case that the data of the unit Y5 does not grow dull.

When the data Bn of the unit Y2 is located at the first order or higher digit and the next-order digit data Bn+1 is "1", as in the above-mentioned case that the data of the unit Y5 does not grow dull, the unit Y2 proceeds from step ST65 to step ST66 and step ST67. Then, it is determined that the unit Y2 loses in polarity discrimination and the units Y2 proceeds to step ST71, since the unit Y5 starts discharging prior to the unit Y2. Alternatively, it is determined that the unit Y2 wins in polarity discrimination because of its number of connected units and its connection length and the units Y2 proceeds to step ST68.

In any case, at least the unit Y5 survives in the competition of data items Bn. It is essential only that one master unit is determined even if power is not supplied to the plurality of units at the same time. This case produces no problem.

As shown in FIG. 11, when identification number signals of two units are different in position from each other by 1 bit or more, both the units are accidentally matched in bit state with each other even if their serial numbers are different.

In such a case, an identification number signal includes a verification signal LAST added to the end of the serial number (see FIG. 11(c)) and the unit which finishes outputting its identification number signal earlier applies a voltage from the direct-current power source (DC) to the communication line (20). Therefore, the unit which does not finish outputting its identification number signal (see FIG. 11(b)) detects a high-level voltage of the communication line (20) at the output of a low-level voltage verification signal LAST. As a result, at the time of output of the verification signal LAST, the program proceeds from step ST77 to step ST74 of FIG. 15 and determines that the latter unit loses in polarity discrimination.

When the subroutine of FIG. 15 finishes, the program returns to step ST6 of the main routine of FIG. 14 and the master/slave unit determining means (42) determines that its own unit wins in polarity discrimination based on its serial number. Then, the program proceeds from step ST6 to step ST7. At the step, the transistor (Tr2) of the forced discharge circuit (80) is turned off and the relay switches (Ry1-1, Ry1-2) of the power superposition circuit (50) are turned on, so that power is applied from the direct-current power source (DC) to the communication line (20). Further, the master unit declaration means (43) outputs a master unit declaration signal to the communication line (20) through the transmission circuit (3A).

Thereafter, the program proceeds to step ST8 and the master/slave unit determining means (42) determines that its own unit is a master unit and sets a master unit flag. Then, the program proceeds to step ST9 and sets the timer for Tn seconds. The program then proceeds to step ST10 and stands by until the timer counts to Tn seconds. When the timer counts to Tn seconds, the program proceeds to step ST11 and discriminates the state of the communication line (20).

When the communication line (20) has no problem, for example, when the communication line (20) is in a normal state including no noise or the like, the program returns from step ST11 to step ST8 and repeats operations from step ST8 to step ST11. A direct-current voltage is applied to the communication line (20) and the discharge resistors (R1, R2) are connected to the communication line (20), so that information signal for air conditioning is transmitted between respective outdoor control units (11-C, 11-C, . . . ) and between each outdoor control unit and the indoor control unit (12-C, 12-C, . . . ).

when the master/slave unit determining means (42) determines that its own unit loses in serial number at step ST6, or when the polarity of the communication line (20) can be discriminated at step ST5, the program proceeds to step ST12 and sets the timer for Tw. Then, the program proceeds to step ST13 and stands by until the timer counts to Tw. In detail, since the communication line (20) varies in voltage in the state that the processing of FIG. 15 is made, the polarity of the communication line (20) is unsteady. Therefore, the program stands by unitl the processing of FIG. 15 is finished. A period of time Tw of the timer is set to, for example, (number of output bits+1 bit of a verification signal LAST)× (charging time Tc+discharging time Td).

Thereafter, when the timer counts to Tw, since another outdoor control unit (11-C, 11-C, . . . ) is set to a master unit, signal transmission becomes possible so that the master/slave unit determining means (42) determines that its own unit is a slave unit and sets a slave unit flag. In this step ST14, information signals for air conditioning are transmitted between the respective outdoor control units (11-C, 11-C, . . . ) and between each outdoor control unit and the indoor control unit (12-C, 12-C, . . . ).

when the master unit produces a malfunction or the like at step ST14 so that the polarity of the communication line (20) becomes unsteady, the program proceeds to step ST15 and sets the timer for Tn seconds. Then, the program proceeds to step ST16 and stands by until the timer counts to Tn seconds. When the timer counts to Tn seconds, the program proceeds to step ST17 and discriminates the state of the communication line (20). When the malfunction or the like of a master unit is recovered so that the communication line (20) has no problem, the program returns from step ST17 to step ST14 and information signals for air conditioning are transmitted between the respective outdoor control units (11-C, 11-C, . . . ) and between each outdoor control unit and the indoor control unit (12-C, 12-C, . . . ).

When own unit receives a master unit declaration signal from another outdoor control unit (11-C) at step ST8, the program proceeds to step ST18 and compares the serial number of the outdoor control unit (11-C) having outputted the master unit declaration signal with the serial number of its own unit. When the serial number of its own unit is larger, the program returns to step ST8 and keeps its own unit a master unit.

When the serial number of the other outdoor control unit (11-C, 11-C, . . . ) is larger than that of its own unit, the program proceeds to step ST14 and the determination change means (44) changes its own unit to a slave unit.

When own unit receives a master unit declaration signal from another outdoor control unit (11-C) at step ST6, the program proceeds to step ST13 and stands by until the processing of FIG. 15 is finished.

When a master unit causes a malfunction or the like at step ST11 and step ST17, the state recognizing means (45) recognizes an unsteady state in polarity of the communication line (20). Accordingly, the program proceeds to step ST19, turns off the relay switches (Ry1-1, Ry1-2) of the power superposition circuit (50) and turns on the transistor (Tr2) of the forced discharge circuit (80). Then, the program proceeds to step ST20, sets a change flag and returns to step ST4.

In detail, because of malfunction or the like of a master unit which applies a direct-current voltage to the communication line (20), the restart means (46) restarts an operation of determining whether its own unit is a master unit or a slave unit in order to determine a master unit, and operations from step ST4 are executed.

Specific Effects of Embodiment 1

As mentioned so far, according to Embodiment 1, since a master unit is determined based on a serial number pre-assigned to each outdoor control unit (11-C, 11-C, . . . ) this eliminates a setting work for connecting the power super-position circuit (50) to the communication line (20), thereby simplifying the total setting work.

In addition, an improper setting that two power superposition circuits (50) are connected to the communication line (20) can be securely prevented.

In particular, since there is provided a polarity select circuit (60) having a negative-polarity resistance characteristic, the polarity of the communication line (20) can be discriminated by the terminal voltage of the polarity select means (60) even if the units are connected opposite in polarity to each other. This enables a secure discrimination between a master unit and a slave unit.

Since the power superposition circuit (50) is provided with discharge resistors (R1, R2), there is no need to dispose a choke coil or the like between the direct-current power source (DC) and the communication line (20). This simplifies the circuit configuration.

Since the forced discharge circuit (80) is provided, charges of the communication line (20) after a high-voltage bit of an identification number signal is outputted can be securely discharged. This reduces a transmission time.

Further, since a low-level voltage verification signal LAST is added to an identification number signal, discrimination between a master unit and a slave unit can be securely made based on the verification signal LAST even if signal difference by 1 bit or more occurs between identification number signals.

Since a master unit declaration signal is outputted, one master unit can be determined even if a plurality of master units are set, thereby securely preventing an improper setting.

When it is determined that the communication line (20) is in an unsteady polarity state, an operation of determining whether a subject unit is a master unit or a slave unit can be restarted. Accordingly, even if a master unit causes a malfunction, another outdoor control unit (11-C) can be determined to be a master unit so that a polarity discrimination can be continued. As a result, information signals can be continuously transmitted thereby obtaining enhanced reliability in control.

Since the initial operating point of the polarity select circuit (60) is set to a specific voltage, the operating time of the polarity select circuit (60) can be reduced. This reduces a time for determining whether its own unit is a master unit or a slave unit.

Modification of Embodiment 1

Figure 18:
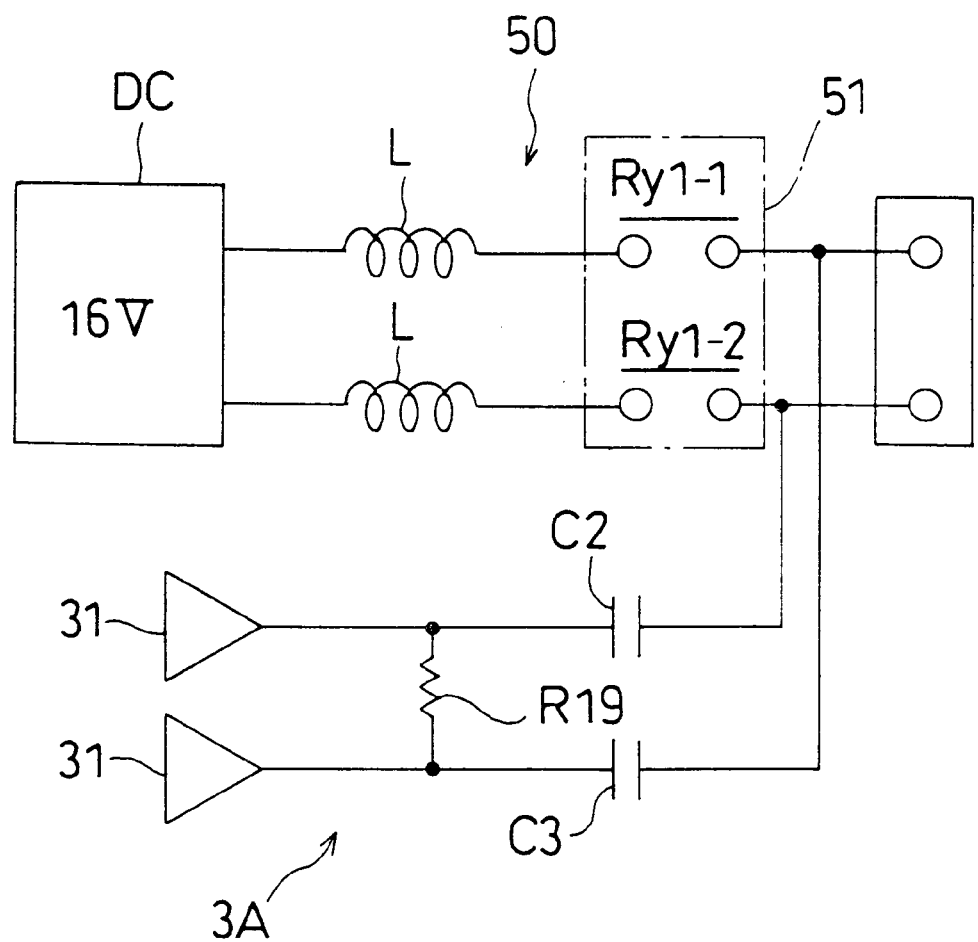
FIG. 18 is a circuit diagram showing another power superposition circuit.

FIG. 18 shows a modification of the power superposition circuit (50). In this modification, choke coils (L, L) are provided instead of the discharge resistors (R1, R2) and the capacitor (C1) of the former embodiment and the transmission circuit (3A) is provided with a discharge resistor (R19) connected between drivers (31, 31) and capacitors (C2, C3).

In the above embodiment, description is made about the communication line (20). However, the present invention may be employed between the indoor control unit (12-C) and the remote control (13).

In the above embodiment, the outdoor control unit (11-C) is provided with a power superposition circuit (50) and the like. However, the power superposition circuit (50) and the like may be provided in the indoor control unit (12-C).

The configuration of the polarity select circuit (60) is not limited to the embodiment. It is essential only that the polarity select circuit has a negative-polarity resistance characteristic.

The inventions of claim 1 to 8 are not limited to application to the air conditioner (10) and therefore may be applied to various kinds of transmission devices.

The invention of claim 1 is not limited to application to the operation of determining whether a subject unit is a master unit or a slave unit.

Embodiment 2

Next, description is made about Embodiment 2 of the present invention with reference to the drawings.

System Configuration

Figure 19:
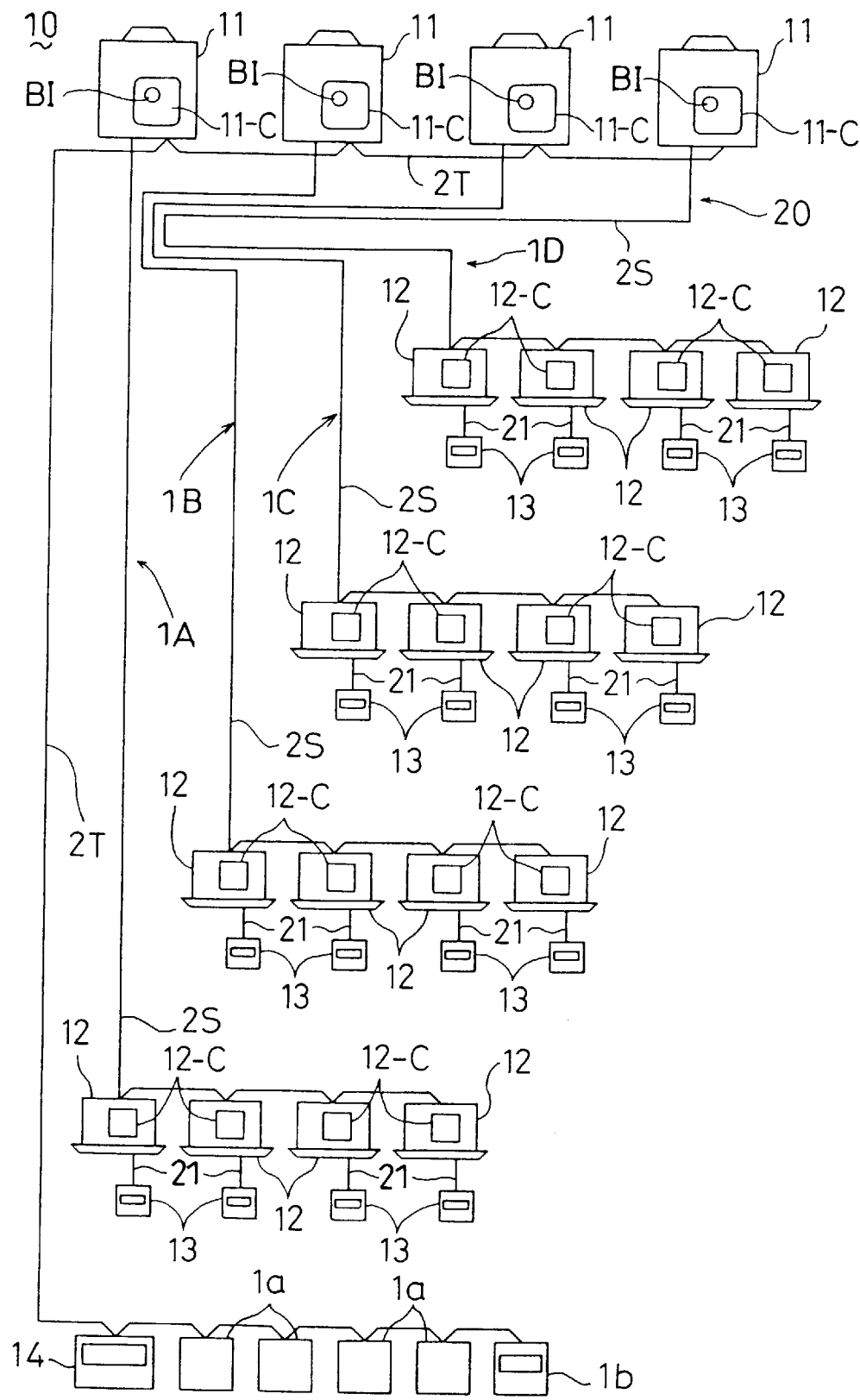
FIG. 19 is a control system hardware configuration diagram of an air conditioner according to Embodiment 2 of this invention.

FIG. 19 shows a control system of another air conditioner (10), which is formed of four indoor side transmission groups (1A–1D) corresponding to respective refrigerant circulating circuits. In detail, though it is not shown, each refrigerant circulating circuit is so designed that four indoor units (12, 12, ...) are connected to an outdoor unit (11) through a refrigerant line so as to be in parallel with each other. One refrigerant circulating circuit forms one indoor side transmission group (1A–1D).

The outdoor unit (11) has at least an outdoor heat exchanger including a compressor, a four-way selector valve and a fan and an outdoor motor-operated expansion valve thereby forming a thermal-source-side unit, though they are not shown. The indoor control unit (12) has at least an indoor motor-operated expansion valve and an indoor heat exchanger including a fan thereby forming a user-side unit, though they are not shown. Each refrigerant circulating circuit is designed so as to be reversible in a refrigerant circulating direction between a cooling operation mode and a heating operation mode.

The outdoor unit (11) has an outdoor control unit (11-C) as a thermal-source-side control unit. The indoor unit (12) has an indoor control unit (12-C) as a user-side control unit. Each indoor side transmission group (1A–1D) forms one control group in such a manner that the outdoor control unit (11-C) and respective indoor control units (12-C, 12-C, ...) are connected to each other through a local transmission line (2S) so as to be data-transmittable between the outdoor control unit and the respective indoor control units (11-C, 12-C, ...)

The outdoor control units (11-C, 11-C, ...) of each indoor side transmission group (1A–1D) are connected to each other through a single centralized transmission line (2T) so as to be data-transmittable between the outdoor control units (11-C, 11-C, ...). The centralized transmission line (2T) is connected at respective outdoor control units (11-C, 11-C, ...) to the local transmission lines (2S, 2S, ...) so as to be data-transmittable between the centralized transmission line (2T) and each local transmission line (2S, 2S, ...), thereby forming one communication line (20).

For data transmission among the outdoor control units (11-C, 11-C, ...), the indoor control units (12-C, 12-C, ...) and the centralized controller (50) in the communication line (20), the balanced communication mode of the AMI communication method as in Embodiment 1 is used. The transmission mode is designed so as to make a half-duplex signal transmission at a preset polarity. The local transmission lines (2S, 2S, ...) and the centralized transmission line (2T) are each composed of positive side and negative side two signal lines (2a, 2b).

The centralized transmission line (2T) is connected to a centralized controller (14). The centralized controller (14) is designed so as to be able to control each of the outdoor units (11, 11, ...) and the indoor units (12, 12, ...).

The centralized transmission line (2T) is connected to four on-off controllers (1a, 1a, ...) and a single schedule timer (1b). The on-off controllers (1a, 1a, ...) each transmit a control signal for activating and deactivating the indoor units (12, 12, ...) of each indoor side transmission group (1A–1D) to control in units of the indoor side transmission groups (1A–1D).

The schedule timer (1b) is for setting to, for example, a plurality of indoor units (12, 12, ...), an operating time and a stopping time of each indoor unit (12) in a unit of one week.

The indoor control units (12-C, 12-C, ...) are each connected to the remote control (13). The remote control (13) is so designed that settings such as activation and deactivation of each indoor unit (12, 12, ...) and a temperature setting can be inputted on the remote control (13).

Configuration of Outdoor Control Unit (11-C)

Figure 20:
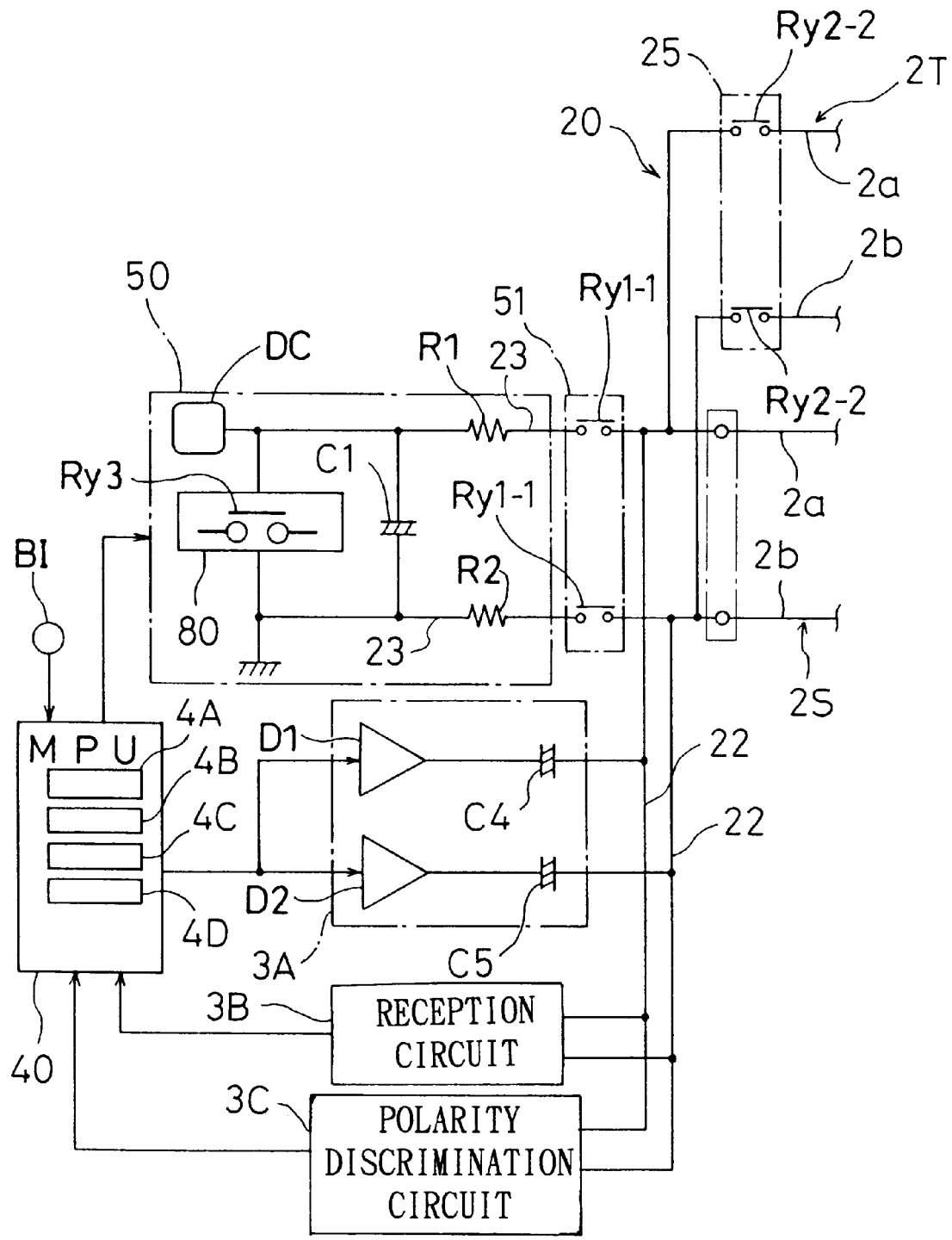
FIG. 20 is a schematic circuit block diagram of an outdoor control unit.

As shown in FIG. 20, the outdoor control unit (11-C) has a configuration similar to that of Embodiment 1. In detail, the outdoor control unit (11-C) comprises a transmission circuit (3A), a reception circuit (3B) and a polarity discriminating circuit (3C). The transmission circuits (3A), the reception circuit (3B) and the polarity discriminating circuit (3C) are connected to an MPU (40).

The transmission circuit (3A) is so composed that two drivers (D1, D2) are connected to a local transmission line (2S) and a centralized transmission line (2T) through capacitors (C4, C5) and a common line (22), and transmits data signals to the communication line (20) according to output signals from the MPU (40).

The reception circuit (3B) is connected to the communication line (20) through the common line (22) and outputs received data to the MPU (40). The polarity discriminating circuit (3C) is connected to the communication line (20) through the common line (22), discriminates the polarities of the local transmission-line (2S) and the centralized transmission line (2T), and outputs polarity discrimination signals to the MPU (40). Based on the polarity discrimination signals, the transmission circuit (3A) matches the polarity of data signals for transmission with the polarity of the communication line (20).

Further, the outdoor control unit (11-C) is provided with a power superposition circuit (50). The power superposition circuit (50) is connected to the communication line (20) through a power supply switch (51) as a switching means.

In the power superposition circuit (50), the direct-current power source (DC) is connected to two signal lines (2a, 2b) of each of the local transmission line (2S) and the centralized transmission line (2T) forming the communication line (20) through a capacitor (C1) and discharge resistors (R1, R2) as terminal resistors for restricting signal distortion. The power superposition circuit (50) applies a set direct-current voltage to the two signal lines (2a, 2b) so that the polarity discriminating circuit (3C) of each outdoor control unit (11-C, 11-C, . . . ) can discriminate the polarity of the communication line (20).

The power supply switch (51) is composed of power supply relay switches (Ry1-1, Ry1-2) of a connection point type and makes a connection and disconnection between the power superposition circuit (50) and the communication line (20).

The centralized transmission line (2T) is connected to the local transmission line (2S) through an inter-group switch (25). The inter-group switch (25) is composed of inter-group relay switches (Ry2-1, Ry2-2) of a connection point type, makes a connection and disconnection between the centralized transmission line (2T) and the local transmission line (2S), and turns off when data is transmitted and received only between the outdoor control unit (11-C) and the indoor control units (12-C, 12-C, . . . ) within its own indoor side transmission group (1A–1D).

The power supply superposition circuit (50) is also provided with a forced discharge circuit (80) having an unshown resistor for discharge. The forced discharge circuit (80) performs the same effects as in Embodiment 1, has a discharge relay switch (Ry3) of a connection point type and turns on after transmission of one data item to discharge charges of the capacitor (C1) and the like.

Configuration of Other Components Such as Indoor Control Unit (12-C)

The indoor control units (12-C, 12-C, . . . ) each have no power superposition circuit mentioned above but have a transmission circuit, a reception circuit and a polarity discriminating circuit as in the outdoor control unit (11-C), though they are not shown. The transmission circuit, the reception circuit and the polarity discriminating circuit are connected to the MPU.

The centralized controller (14) has a power superposition circuit, a transmission circuit, a reception circuit and a polarity discriminating circuit as in the outdoor control unit (11-C), though they are not shown. The transmission circuit, the reception circuit and the polarity discriminating circuit are connected to the MPU.

Configuration of MPU (40) and the Like of Outdoor Control Unit (11-C)

The MPU (40) of the outdoor control unit (11-C) is provided with a power supply determining means (4A) and, as a feature of this invention, a master unit declaration means (4B), a slave unit determining means (4C) and a master-to-slave unit change means (4D). Further, a forcedly setting button (BI) is provided on a control board.

The power supply determining means (4A) is designed so as to determine a master unit for connecting the power superposition circuit (50) to the communication line (20). When the main switch of the air conditioner is thrown, the power supply determining means (4A) outputs a serial number of its own unit with the power supply relay switches (Ry1-1, Ry1-2) and the inter-group relay switches (Ry2-1, Ry2-2) on, and determines that the own outdoor control unit (11-C) is a single master unit by the CSMA/CD (carrier sense multiple access with collision detection) method.

It is a matter of course that the power supply determining means (4A) may also determine a master unit based on the polarity select circuit (60) and the voltage discriminating circuit (70) as described in Embodiment 1.

For example, serial numbers having respective different product numbers are written in the form of 32 bits of information in the outdoor control units (11-C, 11-C, . . . ) and the indoor control units (12-C, 12-C, . . . ), respectively. When the main switch is turned on at the time of installation of an air conditioner or other time, all the power supply determining means (4A) each output less significant 24 bits of a serial number of its own unit to the communication line (20) regardless of the match or mismatch in polarity between the power superposition circuits (50) of the outdoor control units (11-C, 11-C, . . . ). When one outdoor control unit, out of the outdoor control units (11-C, 11-C, . . . ) of either one of polarities, outputs all less significant 24 bits of a serial number, the power supply determining means (4A) of the outdoor control unit determines that the outdoor control unit is a master unit.

When the power supply determining means (4A) determines that its own outdoor control unit is a master unit for power supply, the master unit declaration means (4B) of the outdoor control unit turns on the power supply relay switches (Ry1-l, Ry1-2) and outputs a master unit declaration signal OPC-A4 at set time intervals, for example, in each one minute.

When receiving a master unit declaration signal OPC-A4 from another outdoor control unit (11-C), the slave unit determining means (4C) turns off the power supply relay switches (Ry1-1, Ry1-2) and determines its own outdoor control unit is a slave unit that does not superpose electric power.

When the master-to-slave unit change means (4D) receives a master unit declaration signal OPC-A4 as a power superposition signal from the centralized controller (14) with the master unit declaration means (4B) of the same outdoor control unit outputting another master unit declaration signal OPC-A4, it turns off the power supply relay switches (Ry1-1, Ry1-2) and outputs a master unit cancel signal to the master unit declaration means (4B) of the same outdoor control unit so as to stop the output of the master unit declaration signal OPC-A4, thereby changing its own unit to a slave unit.

The forcedly setting button (BI) forms a forcedly setting means for externally forcedly inputting a master unit setting signal to the master unit declaration means (4B) so that the master unit declaration means (4B) can output a master unit declaration signal OPC-A4. The master unit setting signal of the forcedly setting button (BI) is invalidated when the subject outdoor control unit receives a master unit declaration signal OPC-A4 as a power superposition signal from the centralized controller (14).

Operation of Data Transmission

Next, description is made about data transmission in the above-mentioned air conditioning system (10) with reference to the control flowchart.

Figure 21:
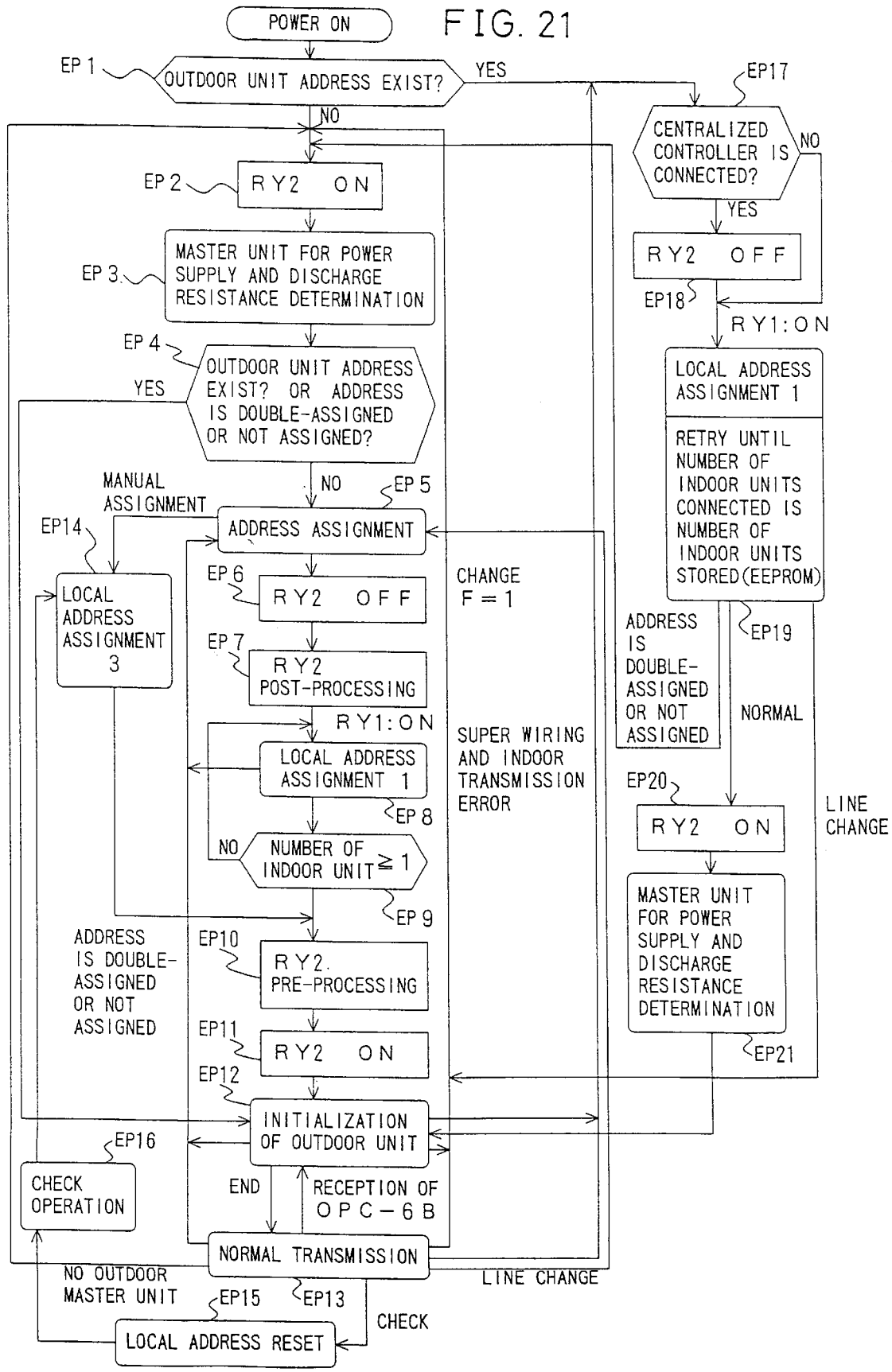
FIG. 21 is a control flow chart of an air conditioning control system up to the start time of air conditioning operation.

FIG. 21 illustrates a control flowchart from the time that the main switch of the air conditioner is turned on to the start time of air conditioning operation.

First, when the main power source is turned on, the program determines, at step EP1, whether an address for data transmission is assigned to the outdoor control units (11-C, 11-C, ... ). The above-mentioned main power source is different from the power source (DC) of the power superposition circuit (50).

For example, immediately after the installation of an air conditioner, since the outdoor control units (11-C, 11-C, ...) have no assigned addresses, the program proceeds to step EP2. At the step EP2, the program turns on the inter-group relay switches (Ry2-1, Ry2-2) to allow signal transmission between the outdoor control units (11-C, 11-C, ... ), and then proceeds to step EP3. At the step, the power supply determining means (4A) determines a master unit.

In detail, serial numbers formed of respective different product numbers are written in the form of 32 bits of information in the outdoor control units (11-C, 11-C, ... ) respectively. When the main switch is thrown, the power supply determining means (4A) outputs less significant 24 bits of a serial number of its own unit to the communication line (20). When one outdoor control unit, out of the outdoor control units (11-C, 11-C, ... ) of either one of polarities, outputs all less significant 24 bits of a serial number by the CSMA/CD method, the power supply determining means (4A) of the outdoor control unit determines that the outdoor control unit is a master unit.

When the centralized controller (14) is connected to the communication line (20) as in the present embodiment, format is made so that the centralized controller (14) is forcedly determined to be a master unit for power supply.

Then, when the master unit is determined, the program proceeds to step EP4 and determines whether addresses of the outdoor control units (11-C, 11-C, ... ) have been assigned and whether each address of the outdoor control units (11-C, 11-C, ... ) is double-assigned or has not been assigned. When no addresses have been assigned to the outdoor control units (11-C, 11-C, ... ), or when the address of a part of the outdoor control units (11-C, 11-C, ... ) is double-assigned or has not been assigned, the program proceeds to step EP5 and automatically executes address assignment.

As mentioned above, since the master unit to supply electric power has been determined, data transmission can be established between the outdoor control units (11-C, 11-C, ... ) and between the outdoor control units and the corresponding indoor control units (12-C, 12-C, ... ), so that one outdoor control unit (11-C) for address assignment based on serial numbers is determined to be a master unit for address assignment. Then, the master unit for address assignment assigns addresses to all the outdoor control units (11-C, 11-C, ... ) and all the indoor control units (12-C, 12-C, ... ). After that time, based on the addresses, data transmission is made between the outdoor control units (11-C, 11-C, ... ) and between the outdoor control units and the corresponding indoor control units (12-C, 12-C, ... ).

Then, when the air conditioning system (10) is not a commonly-called "super wiring", the program proceeds from step EP5 to step EP6. In detail, the super wiring means a wiring state that the outdoor control units (11-C, 11-C, ... ) and the indoor control units (12-C, 12-C, ... ) are connected through a single communication line (20). Whether to be a super wiring or not is previously written in the outdoor control units (11-C, 11-C, ... ) and the like. When it is not the case of a super wiring, the program proceeds to step EP6. At the step, the program turns off the inter-group relay switches (Ry2-1, Ry2-2) and then proceeds to step EP7. At the step, the program executes post-processing of the switching of the inter-group relay switches (Ry2-1, Ry2-2), turns on the power supply relay switches (Ry1-1, Ry1-2) and then proceeds to step EP8.

At step EP8, each outdoor control unit (11-C, 11-C, ... ) executes first assignment processing of assigning addresses of its own units and recognizes the number of indoor control units (12-C, 12-C, ... ) which belong to their own indoor side transmission group (1A–1D), that is, transmits a given command to each of the indoor control units (12-C, 12-C, ... ) to capture the number of response signals. Then, at step EP9, whether the number of its own indoor control units (12-C, 12-C, ... ) is 1 or more is determined. When no indoor control unit (12-C) is recognized, this means an improper connection. Accordingly, the program proceeds to step EP8.

When the indoor control units (12-C, 12-C, ... ) are connected, the program proceeds to step EP10, at the step turns off the inter-group relay switches (Ry2-1, Ry2-2) and then proceeds to step EP7. At step EP7, pre-processing for switching the inter-group relay switches (Ry2-1, Ry2-2) is executed. When the subject outdoor control unit is a master unit, the power supply relay switches (Ry1-1, Ry1-2) of the unit are turned on. When the subject outdoor control unit is a slave unit, the power supply relay switches (Ry1-1, Ry1-2) of the unit are turned off.

Thereafter, the program proceeds to step EP11, turns on the inter-group relay switches (Ry1-1, Ry1-2) and then proceeds to step EP12. At the step, each outdoor control unit (11-C, 11-C, ... ) executes initialization processing to the indoor control units (12-C, 12-C, ... ) of its own indoor side transmission group (1A–1D). When the initialization processing is finished, the program proceeds to step EP13. At the step, normal transmission processing is started thereby starting air conditioning operation.

When an address is double-assigned or has not been assigned at step EP8, step EP12 and step EP13, the program returns to step EP5 and renews the address assignment.

When the program changes a subject unit from a master unit to a slave unit at step EP12 and step EP13, a change flag F is set, the program returns to step EP2 and renews the determination of a master unit and the like from the beginning.

When addresses are manually assigned to the outdoor control units (11-C, 11-C, ... ) and the indoor control units (12-C, 12-C, ... ) respectively at step EP5, the program proceeds to step EP14 and each outdoor control unit (11-C, 11-C, ... ) executes third assignment processing of assigning addresses to its own units as in step EP8. That is, the outdoor control unit recognizes the number of indoor control units (12-C, 12-C, ... ) belonging to its own indoor side transmission group (1A–1D), and the program proceeds to step EP10 and executes the above-mentioned operation.

When the program determines the absence of a master unit at the normal transmission processing of step EP13, no direct-current voltage is superposed on the voltage of the communication line (20) so that the program returns to step EP2 and renews the determination of a master unit and other operations. When the power source of one indoor control unit (12-C, 12-C, . . . ) is reset (ON→OFF→ON), the subject indoor control unit (12-C, 12-C, . . . ) outputs an operation code signal OPC-6B. When the outdoor control unit (11-C) receives the operation code signal OPC-6B, the program returns to step EP12 and renews the initialization processing.

When a check switch is turned on at the normal transmission processing of step EP13, that is, when a switch for checking whether a refrigerant circulating circuit is matched with an indoor side transmission group (1A–1D) is turned on, the program proceeds to step EP15 and executes reset processing of local addresses. Thereafter, the program proceeds to step EP16, executes a check operation and determines whether the refrigerant circuit is matched with an indoor side transmission group (1A–1D) based on a refrigerant temperature and the like. Then, the program proceeds to step EP14 and executes the above-mentioned operation.

When addresses are assigned to the outdoor control units (11-C, 11-C, . . . ) at step EP4, the program directly proceeds to step EP12 and executes initialization processing.

When addresses are assigned to the outdoor control units (11-C, 11-C, . . . ) at step EP1, the program proceeds to step EP17 and determines whether the centralized controller (14) is connected to the centralized transmission line (2T). When the centralized controller (14) is not connected to the centralized transmission line (2T), the program proceeds to step EP18, turns off the inter-group relay switches (Ry2-1, Ry2-2), then turns on the power supply relay switches (Ry1-1, Ry1-2) and proceeds to step EP19. When the centralized controller (14) is connected to the centralized transmission line (2T), the program turns on the power supply relay switches (Ry1-1, Ry1-2) at step EP17 and proceeds to step EP19.

At step EP19, each outdoor control units (11-C, 11-C, . . . ) executes second assignment processing of assigning addresses to its own units, and executes the processing of addresses of its own units until the number of connected indoor control units (12-C, 12-C, . . . ) which are recognized is matched with the number of indoor control units (12-C, 12-C, . . . ) which have been stored.

When transmission is properly made between each outdoor control unit (11-C, 11-C, . . . ) and the indoor control units (12-C, 12-C, . . . ), the program proceeds to step EP20 and turns on the inter-group relay switches (Ry2-1, Ry2-2). Then, the program proceeds to step EP21 and executes processing of determining a master unit for power supply and other processing in relation to each outdoor control unit (11-C, 11-C, . . . ) as in step EP3. When the subject unit is a master unit, the power supply relay switches (Ry1-1, Ry1-2) are turned on. When the subject unit is a slave unit, the power supply relay switches (Ry1-1, Ry1-2) are turned off. Thereafter, the program proceeds to step ep12, executes initialization processing to the indoor control units (12-C, 12-C, . . . ) and executes the above-mentioned operation.

When an address is double-assigned or has not been assigned at step EP19, the program returns to step EP2 and renews determination of a master unit and other operations.

When a connection change switch is turned on at step EP13 and step EP19, the control mode may be changed. Therefore, the program returns to step EP5 and renews address assignment.

When transmission failure occurs between each outdoor control unit and the indoor control units (12-C, 12-C, . . . ) at step EP12 and step EP13, the program proceeds to step EP17 and executes the above-mentioned operation.

Processing of Determining Master Unit

Figure 22:
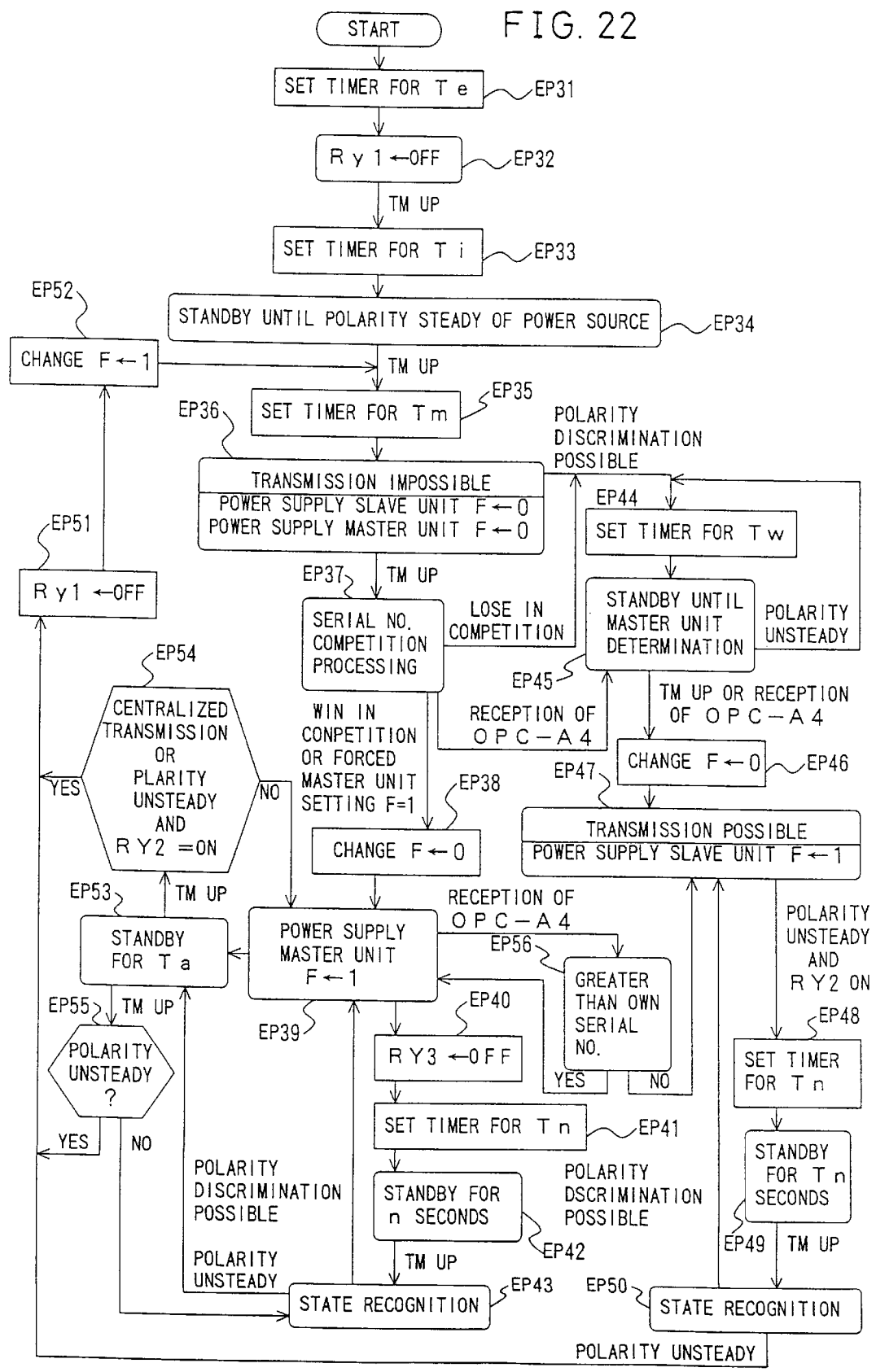
FIG. 22 is a control flow chart of a mater unit determination processing.

Next, description is made about processing of determining a master unit of steps EP3 and EP21 with reference to FIG. 22. Control operation of FIG. 22 is substantially equal to the control operation of FIG. 14 and therefore has many similar aspects. Here, description will be made in the order of steps EP of FIG. 22.

First, the program starts processing of determining a master unit and sets the timer for Te seconds at step EP31. Then, the program proceeds to step EP32 and turns off the power supply relay switches (Ry1-1, Ry1-2) of the power superposition circuit (50). When the timer counts to Te seconds, the program proceeds to step EP33, sets the timer for Ti seconds and stands by until the timer counts to Ti seconds. In detail, when charges are left in the interface part of the unit connected to the communication line (20), format is made so that the outdoor control units (11-C, 11-C, . . . ) are set to slave units. Therefore, the program stands by until charges of the communication line (20) are discharged and the communication line (20) becomes steady.

Thereafter, the program proceeds to step EP35, sets the timer for Tm seconds and then at step EP36 determines whether transmission is possible. That is, whether the polarity discriminating circuit (3C) outputs a polarity signal is determined. Then, the master unit flag and the slave unit flag are reset.

Description is made about the case that the centralized controller (14) is not connected to the communication line (20) and the polarity discriminating circuit (3C) outputs no polarity signal, that is, the case that a master unit for power supply is not set.

When the timer counts to Tm seconds, the program proceeds to step EP37 and executes competition processing based on serial numbers between the outdoor control units (11-C, 11-C, . . . ). In the competition processing, each outdoor control unit (11-C, 11-C, . . . ) outputs its serial number. When an outdoor control unit outputs the entire serial number according to the CSMA/CD method, the unit wins in the competition. When the outdoor control unit cannot output the entire serial number, the unit loses in the competition.

In detail, each outdoor control unit (11-C, 11-C, . . . ) is set so as to output its serial number from the least significant bit in an ascending order. When one outdoor control unit (11-C) outputs data "0" of its serial number and another outdoor control unit (11-C, 11-C, . . . ) outputs data "1" of its serial number, the former outdoor control unit loses in the competition. As a result, a single outdoor control unit (11-C) survives.

Thereafter, when the subject unit wins in the competition between serial numbers, the program proceeds to step EP38 and resets the change flag F and the master unit declaration means (4B) transmits a master unit declaration signal OPC-A4 to the other outdoor control units (11-C, 11-C, . . . ) through the centralized transmission line (2T). Then, the program proceeds to step EP39 and sets the master unit flag. Further, the program turns on the power supply relay switches (Ry1-1, Ry1-2) and the inter-group relay switches (Ry2-1, Ry2-2) and proceeds to step EP40. At the step, the discharge relay switch (Ry3) is turned off and the program proceeds to step EP41. The program sets the counter for Tn seconds, proceeds to step EP42 and stands by until the timer counts to Tn seconds. When the timer counts to Tn seconds, the program proceeds to step EP43 and discriminates the state of the communication line (20).

When the communication line (20) has no problem, for example, when the communication line (20) is in a normal state without noise, the program returns from step EP43 to step EP39 and repeats the operations from step EP39 to step EP43. Direct-current voltage is applied to the communication line (20) and the discharge resistors (R1, R2) are connected to the communication line (20). Then, at step EP13 of FIG. 21, data on air conditioning is transmitted between each outdoor control unit (11-C, 11-C, ...) and the indoor control units (12-C, 12-C, ...).

when a subject outdoor control unit loses in the competition based on serial numbers at step EP37, or when the polarity of the communication line (20) can be discriminated at step EP36, for example, when the centralized controller (14) is connected to the centralized transmission line (2T), the program proceeds to step EP44 and sets the timer for Tw. Then, the program stands by at step EP45 until the timer counts to Tw. In detail, since the voltage of the communication line (20) varies during the competition of step EP37 and therefore the polarity of the communication line (20) is unsteady, the program stands by until the competition processing is finished. The timer is set in correspondence with a time necessary for the competition processing, for example, for 8 minutes.

When the timer counts to Tw or when the subject outdoor control unit receives a master unit declaration signal OPC-A4 from another outdoor control unit (11-C), the program proceeds to step EP46, resets the change flag F and proceeds to step EP47. In this state, since the other outdoor control unit (11-C) is determined to be a master unit, the subject control unit can transmit data. As a result, the slave unit determining means (4C) of the subject control unit determines that its own unit is a slave unit and set the slave unit flag, so that data on air conditioning is transmitted between each outdoor control unit (11-C, 11-C, ...) and the indoor control units (12-C, 12-C, ...).

At step EP47, when the master unit produces a trouble and the polarity of the communication line (20) becomes unsteady and inter-group relay switches (Ry2-1, Ry2-2) are turned on, the program proceeds to step EP48 and sets the timer for Tn seconds. Then, the program proceeds to step EP49 and stands by until the timer counts to Tn seconds. When the timer counts to Tn seconds, the program proceeds to step EP50 and discriminates the state of the communication line (20). When the trouble of the master unit is recovered and the communication line (20) has no problem, the program returns from step EP50 to step EP47 and data on air conditioning is transmitted between each outdoor control unit (11-C, 11-C, ...) and the indoor control units (12-C, 12-C, ...).

When the outdoor control unit (11-C) receives a maser unit declaration signal OPC-A4 from another outdoor control unit (11-C) at step EP37, the program proceeds from step EP45 to step EP46 and then proceeds to step EP47. At the step, the subject outdoor control unit becomes a slave unit which does not supply power.

When the centralized controller (14) having an opposite polarity is connected at step EP50, it is determined that the communication line (20) is unsteady in polarity. Accordingly, the program proceeds to step EP51, and turns off the power supply relay switches (Ry2-1, Ry2-2) to stop power supply. Then, the program proceeds to step EP52, sets the change flag F, returns to step EP35 and renews processing of determining a master unit.

At steps EP39 and EP43, when overcurrent flows so that the communication line (20) becomes unsteady in polarity, the program proceeds to step EP53, starts counting the timer and stands by until the timer counts to Ta. When the timer counts to Ta and current is recovered, the program proceeds to step EP54 and determines whether this is the case that centralized transmission is made or the case that the polarity is unsteady and inter-group relay switches (Ry2-1, Ry2-2) are turned on. When centralized transmission is made, the program proceeds to EP51 and then to EP52 and returns from EP52 to step EP35. At the step EP35, the program renews processing of determining a master unit. In the case that the centralized transmission is not made, the program returns to step EP39.

When proceeding from step EP53 to step EP55, the program determines whether the polarity of the communication line (20) is unsteady. When the polarity can be discriminated, the program returns to step EP43. When the polarity is unsteady, the program returns to step EP35 through step EP51 and step EP52 and then renews processing of determining a master unit.

When the subject outdoor control unit receives a master unit declaration signal OPC-A4 from another outdoor control unit (11-C) at step EP39, the program proceeds to step EP56 and compares the subject unit's serial number with the serial number of the outdoor control unit (11-C) having outputted the master unit declaration signal OPC-A4. When the serial number of the subject unit is smaller, the program returns to step EP39 and keeps the subject unit a master unit.

On the other hand, when the serial number of the other outdoor control unit (11-C) is larger than that of the subject outdoor control unit, the program proceeds to step EP45 and changes the subject unit to a slave unit.

Transmission of Master Unit Declaration Signal OPC-A4

Figure 23:
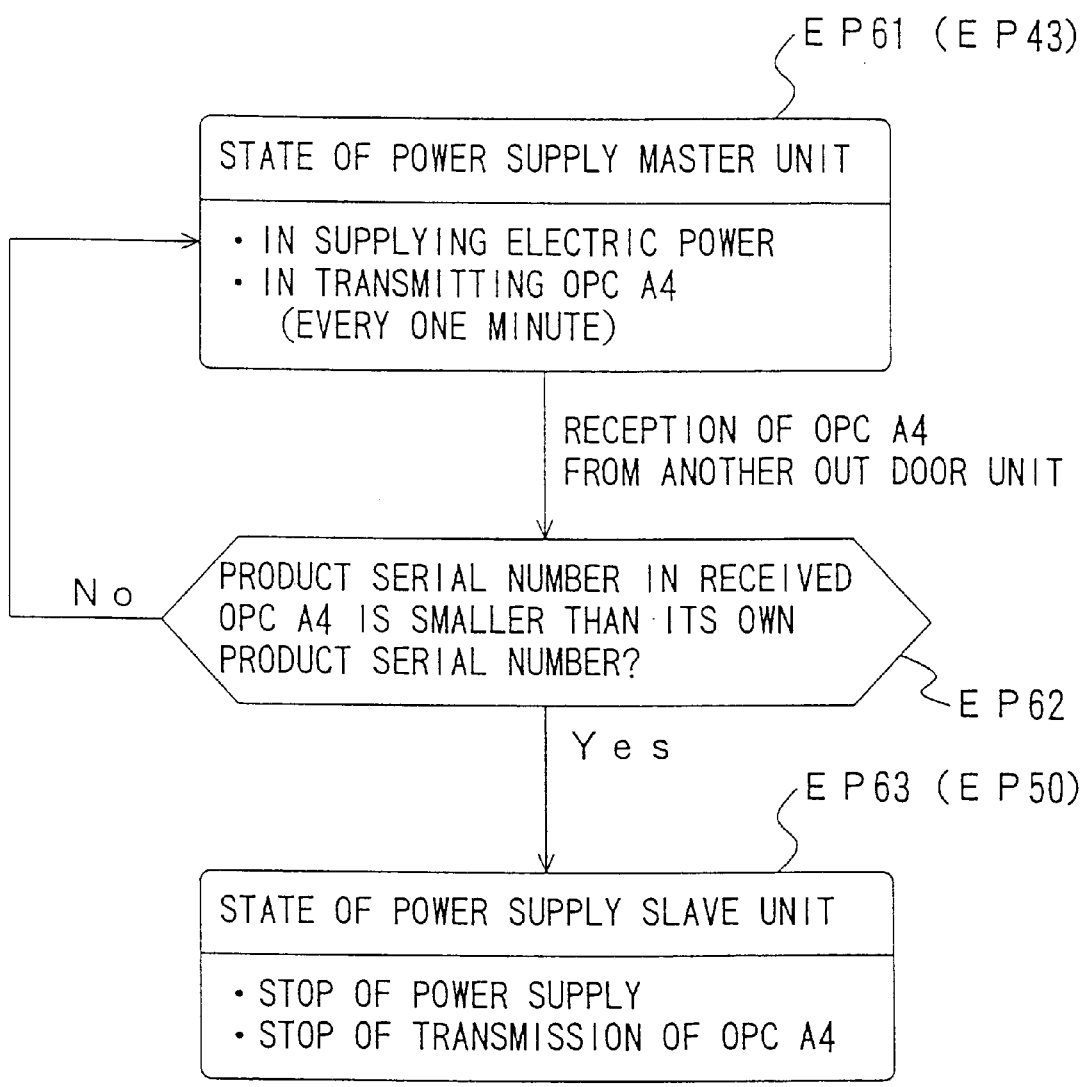
FIG. 23 is a control flow chart at the time of reception of a master unit declaration signal.

Description is made about a transmitting operation of a master unit declaration signal OPC-A4 in the processing of determining a master unit of FIG. 22 with reference to FIG. 23.

At step EP43, the outdoor control unit (11-C) determined to be a master unit executes normal data transmission, supplies electric power to the communication line (20) and outputs a mater unit declaration signal OPC-A4 to the centralized transmission line (2T) every minute, as shown in step EP61 of FIG. 23.

Thereafter, when the outdoor control unit (11-C) receives a master unit declaration signal OPC-A4 from another outdoor control unit (11-C), the program proceeds to step EP62 and compares the subject unit's serial number with the serial number of the outdoor control unit (11C) having outputted the master unit declaration signal OPC-A4. When the subject unit's serial number is smaller, the program returns to step EP39 and keeps the subject unit a master unit.

On the other hand, when the serial number of the other outdoor control unit (11-C) is smaller than that of the subject outdoor control unit, the program proceeds to step EP63 and changes the subject unit to a slave unit. In detail, the program proceeds to step EP50 of FIG. 22 and the subject outdoor control unit (11-C) is determined to be a slave unit. Then, in step EP3 and step EP21 of FIG. 21, the power supply relay switches (Ry1-1, Ry1-2) are turned off.

Figure 24:
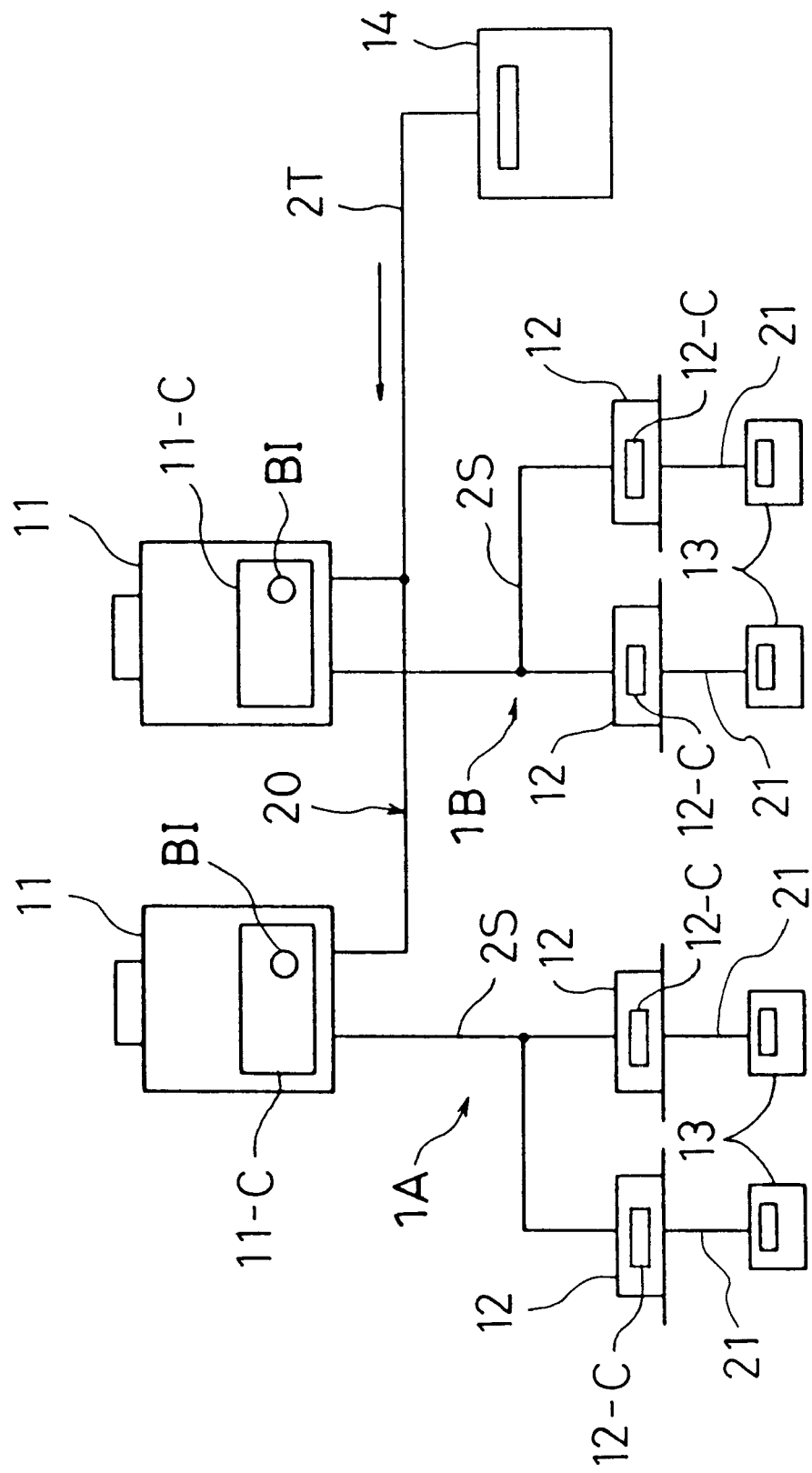
FIG. 24 is a schematic control system configuration diagram when a centralized controller is connected.

For example, as shown in FIG. 24, when the centralized controller (14) is first not connected to the centralized transmission line (2T) and is then connected thereto, since format is made so that the centralized controller (14) necessarily becomes a master unit, the centralized controller (14) is set to a master unit.

Accordingly, the centralized controller (14) outputs a master unit declaration signal OPC-A4 as a power superposition signal equal to a master unit declaration signal OPC-A4 outputted from the outdoor control unit (11-C). As a result, the outdoor control unit (11-C) which has been a master unit is changed to a slave unit by the master-to-slave unit change means (4D) and the master unit declaration means (4B) stops transmission of a master unit declaration signal OPC-A4 by a master unit canceling signal of the master-to-slave unit change means (4D), so that all the outdoor control units (11-C, 11-C, . . . ) are set to slave units.

Thereby, a standby time of 8 minutes in steps EP44 and EP45 of FIG. 22 is eliminated.

Case that Outdoor Control Unit (11-C) is Post-connected

Figure 25:
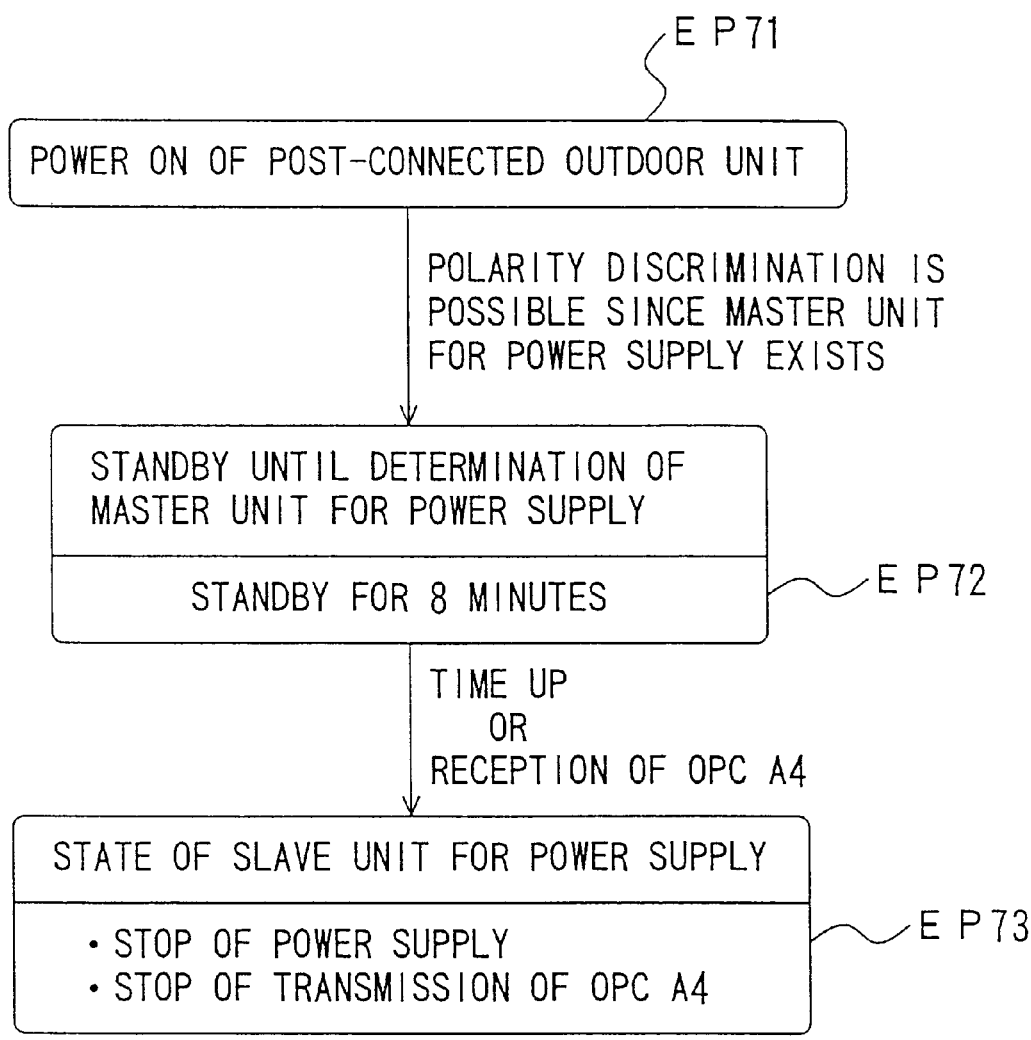
FIG. 25 is a control flow chart at the time of post-connection of an outdoor control unit.

Description is made about the case that the outdoor control unit (11-C) is added by post-connection with reference to the control flowchart of FIG. 25.

Figure 26:
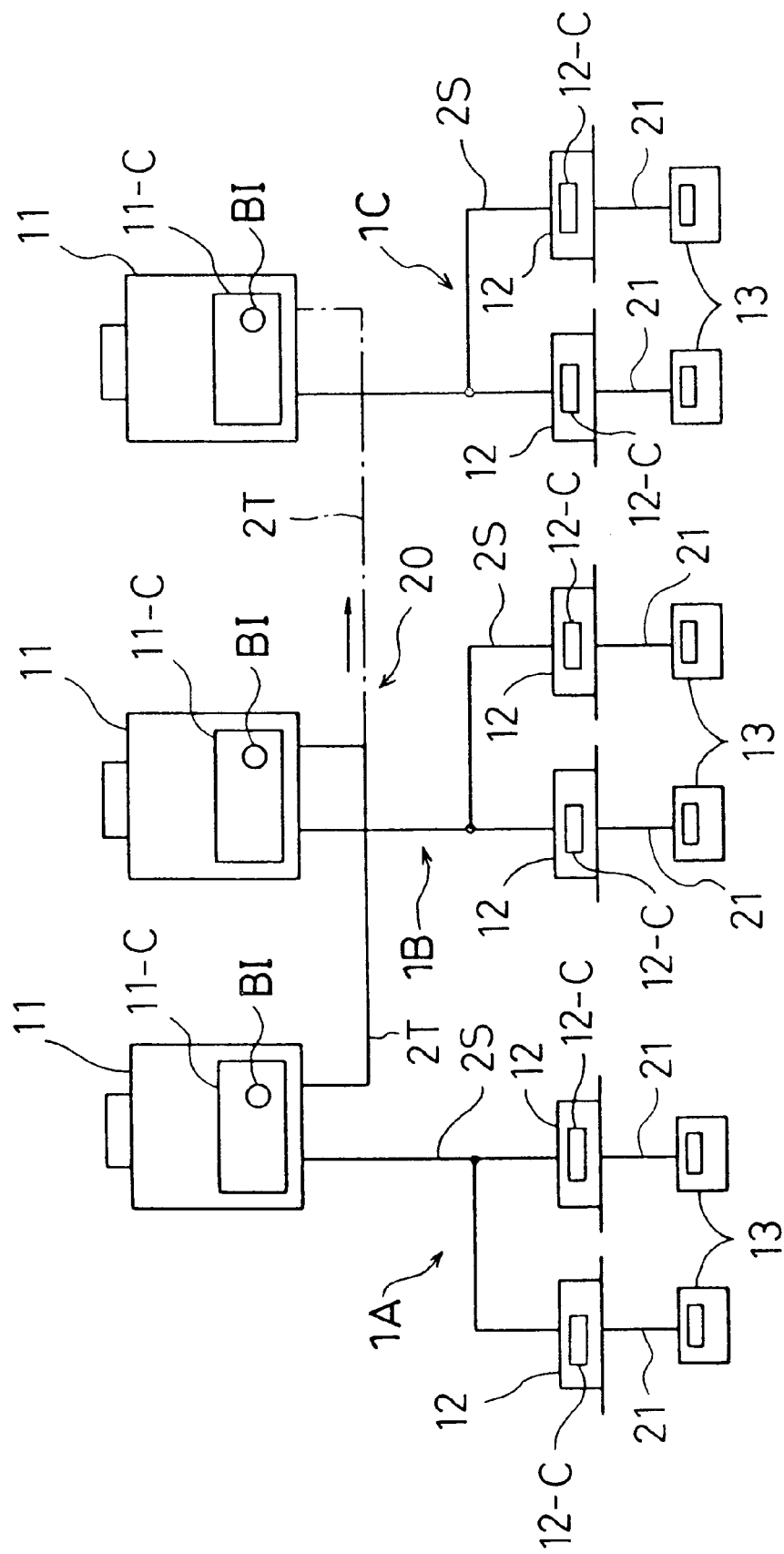
FIG. 26 is a schematic control system configuration diagram at the time of post-connection of the outdoor control unit.

For example, as shown in FIG. 26, in the condition that two indoor side transmission groups (1A, 1B) are connected through the centralized transmission line (2T) and the centralized controller (14) has not been connected, one indoor side transmission group (1C) is connected and one outdoor control unit (11-C) is additionally connected to the centralized transmission line (2T). In this case, at step EP71 of FIG. 25, the added outdoor control unit (11-C) turns on the main switch.

Thereafter, since a master unit has already been determined and the centralized transmission line (2T) is data-transmittable, the program on the added outdoor control unit (11-C) proceeds to step EP72 and stands by until the timer counts to Tw (8 minutes). In other words, the program on the added outdoor control unit (11-C) proceeds to step EP45 through step EP31 and step EP36.

In this condition, as mentioned above, since the outdoor control unit (11-C) determined to be a master unit outputs a master unit declaration signal OPC-A4 in every one minute, the added outdoor control unit (11-C) receives the master unit declaration signal OPC-A4 and the program proceeds to step EP73. That is, the program proceeds to step EP50 of FIG. 22.

As a result, it is possible to eliminate a competition processing time of step EP36 of FIG. 22 and a standby time of 8 minutes of steps EP44 and EP45, so that data transmission can be started after a standby time for outputting a master unit declaration signal OPC-A4 of at most one minute.

Setting Operation of Forcedly Setting Button (BI)

Figure 27:
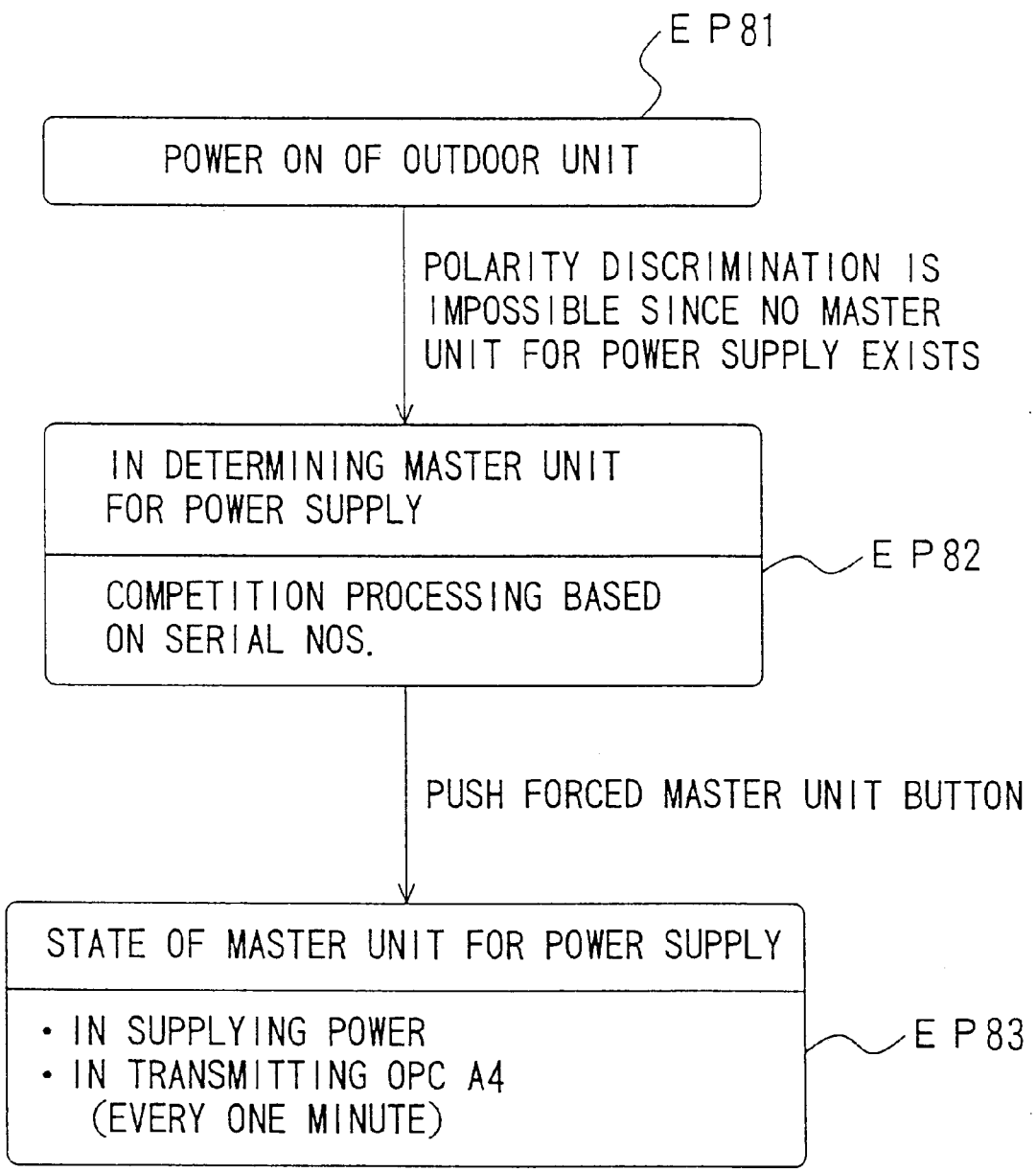
FIG. 27 is a control flow chart at the time of switch-on of a forcedly setting button.

Next, description is made about an operation of determining a master unit by the forcedly setting button (BI) with reference to the control flowchart of FIG. 27.

Figure 28:
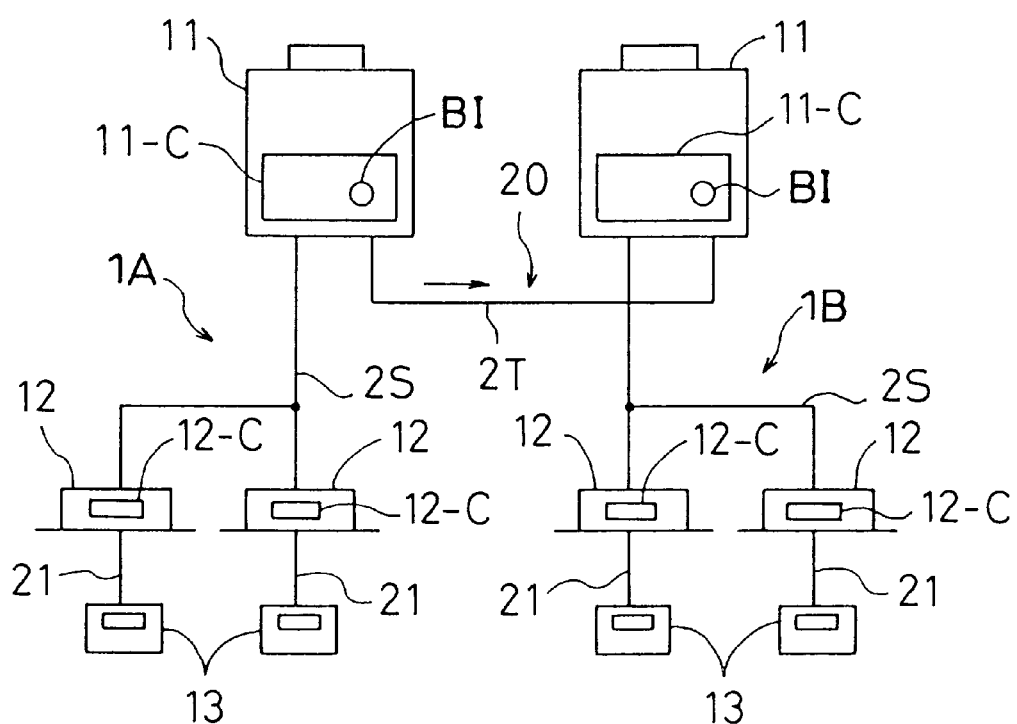
FIG. 28 is a schematic control system configuration diagram at the time of switch-on of the forcedly setting button.

For example, in the condition that the centralized controller (14) is not connected as shown in FIG. 28, when two indoor side transmission groups (1A, 1B) are connected and a master unit is determined, the main switch is turned on at step EP81 and the above-mentioned control processing of FIG. 22 is then made.

Thereafter, the program proceeds from step EP81 to step EP82 and executes a competition between serial numbers of step EP37 of FIG. 22. At the time, when the forcedly setting button (BI) of one outdoor control unit (11-C) is turned on, the program proceeds to step EP83.

In detail, for the outdoor control unit (11-C) whose forcedly setting button (BI) is turned on, the master unit declaration means (4B) outputs a master unit declaration signal OPC-A4 and the program returns to step EP43 of FIG. 22. As a result, the outdoor control unit (11-C) whose forcedly setting button (BI) is turned on is set to a master unit while the other outdoor control units (11-C, 11-C, . . . ) are set to slave units.

In this case, when the centralized controller (14) is connected to the centralized transmission line (2T), the input signal of the forcedly setting button (BI) is invalidated. Also in this case, the centralized controller (14) is set to a master unit.

As a result, it is possible to eliminate a competition processing time of step EP36 of FIG. 22 and a standby time of steps EP44 and EP45 of 8 minutes.

Specific Effects of Embodiment 2

As mentioned so far, according to Embodiment 2, the outdoor control unit (11-C) set to a master unit outputs a master unit declaration signal OPC-A4 in every specific time and the other outdoor control units (11-C, 11-C, . . . ) receiving the master unit declaration signal OPC-A4 are set to slave units. Accordingly, even if another outdoor control unit (11-C) is added, it is not necessary to set a master unit for supplying electric power once more. This reduces a time for determining a master unit. As a result, air conditioning operation can be promptly started, thereby resulting in enhanced air conditioning control and enhanced comfortableness.

In particular, when data is transmitted using AMI signals, power supply for polarity discrimination can be promptly made. This advances the starting time of data transmission thereby enhancing air conditioning control.

Further, since the outdoor control unit (11-C) can be manually set to a master unit by the forcedly setting button (BI), setting of a master unit can be promptly made. As a result, a time for determining a master unit can be reduced so that air conditioning operation can be promptly started.

Furthermore, when the centralized controller (14) is connected, the centralized controller (14) is set so as to be a master unit. When the outdoor control unit (11-C) as a master unit receives a power superposition signal from the centralized controller (14), the outdoor control unit (11-C) is changed to a slave unit. Accordingly, it is not necessary to set a master unit once more. This reduces a time for determining a master unit so that air conditioning operation can be promptly started.

Modification of Embodiment 2

In Embodiment 2, description is made about the air conditioning control system (10) having four indoor side transmission groups (1A–1D). However, application of the present invention is not limited to only four indoor side transmission groups (1A–1D). The indoor side transmission group (1A–1D) may be formed of a single indoor control unit (12).

Industrial Applicability

As mentioned so far, a transmission device and an operation control device for air conditioner of this invention are useful for air conditioner installed in large-scale buildings and the like having a plurality of thermal-source-side units and a plurality of user-side units, and in particular is suitable for an air conditioner in which information is transmitted and received by matching the polarity in the communication line.

We claim:

1. An air conditioning device in which a plurality of air conditioning control units (11-C, 11-C, . . . ) are connected to each other through a communication line (20) composed of two signal lines (2a,2b) having either positive polarity or negative polarity and a control signal for controlling air conditioning is bidirectionally transmitted at a proper polarity between the control units (11-C, 11-C, . . . ), one out of the control units (11-C, 11-C . . . ) functioning to apply a direct-current voltage to the communication line (20) in order to automatically determine each polarity of the signal lines (2a,2b), said air conditioning control units (11-C, 11-C, . . . ) each comprising:

power superposition means (50) for applying a specific direct-current voltage from a power source to the communication line (20);

polarity select means (60) which has a negative-polarity resistance characteristic that current increasingly flows as the applied voltage is lowered to reduce the internal resistance and is connected in series to the power source while being applied with the direct-current voltage, wherein the voltage Vn corresponding to the minimum current value based on the negative-polarity resistance characteristic is set larger than the power source voltage, the maximum current value Id based on the negative-polarity resistance characteristic is set smaller than the minimum overcurrent value Is of the communication line (20), the terminal voltage drops when the power source has the same polarity as in the communication line (20), and the terminal voltage rises to vary the terminal voltage for determining the polarity of the communication line (20) when the power source is different in polarity from the communication line (20)

number output means (41) for controlling the power superposition means (50) such that the power superposition means (50) outputs to the communication line (20) a bit signal based on a unit number preassigned to each of the control units (11-C, 11-C, ...), by using a power-source voltage to be superposed on the voltage of the communication line (20);

voltage discriminating means (70) for detecting the terminal voltage of the polarity select means (60) and outputting a low-voltage signal when the terminal voltage is a set voltage or less and a high-voltage signal when the terminal voltage is above the set voltage, respectively, and master/slave unit determining means (42) for observing the voltage of the communication line (20), determining the control unit to be a slave unit whose power superposition means (50) applies no direct-current voltage to the communication line (20) and disconnecting the power source and the communication line (20) from each other, when detecting a high-level voltage of the communication line (20) at the time of outputting a "0" bit of the unit number of the control unit, or when the voltage discriminating means (70) outputs a high-voltage signal at the time of outputting a "1" bit of the unit number of the control unit, while determining the control unit to be a master unit whose power superposition means (50) applies a direct-current voltage to the communication line (20) and establishing a connection between the power source and the communication line (20) when the voltage discriminating means (70) outputs a low-voltage signal and the entire unit number of the control unit is outputted and then deactivating the number output means (41) to complete the operation of determining to be a master unit or a slave unit.

2. The air-conditioning device according to claim 1, further comprising discharge resistors (R1,R2) for discharging residual charges of the signal lines (2a,2b) forming the communication line (20).

3. The air-conditioning device according to claim 2, wherein the discharge resistors (R1,R2) are provided in the power superposition means (50).

4. The air conditioning device according to claims 1, wherein the air conditioning control unit (11-C, 11-C, ...) comprises forced discharge means (80) for discharging charges in the communication line (20) immediately after the number output means (41) outputs a "1" bit of a unit number of the control unit.

5. The air conditioning device according to claim 1, wherein the number output means (41) outputs a "0" bit verification signal after outputting the unit number of the control unit.

6. The air conditioning device according to claim 1 wherein the air conditioning control unit (11-C, 11-C, ...) comprises:

master unit declaration means (43) for outputting a master unit declaration signal to the communication line (20) when the master/slave unit determining means (42) determines a master unit; and determination changing means (44) for changing the master unit determined by the master/slave unit determining means (42) to a slave unit when the determination changing means receives a master unit declaration signal from another air conditioning control unit (11-C, 11-C, ...) and the air conditioning unit (11-C, 11-C, ...) which has outputted the master unit declaration signal has a greater unit number.

7. The air conditioning device according to claim 1, wherein the air conditioning control unit (11-C, 11-C, ...) comprises:

state recognizing means (45) for recognizing an unsteady state in polarity of the communication line (20); and restart means (46) for restarting operations of the number output means (41) and the master/slave unit determining means (42) to determine whether to be a master unit or a slave unit when the state recognizing means (45) recognizes an unsteady state in polarity of the communication line (20).

8. The air conditioning device according to claim 1, wherein the air conditioning control unit (11-C, 11-C, ...) comprises initializing means (47) for applying a set voltage to the polarity select means (60) so that the polarity select means (60) has a designated voltage value at the initial operation point.

9. The air conditioning device according to claim 1, wherein the communication line (20) has a centralized transmission line (2T) and a plurality of local transmission lines (2S, 2S, ...), each of the air conditioning control units (11-C) is a thermal-source-side control unit which is connected with a single or a plurality of user-side control units (12-C) through the respective local transmission lines (2S,2S, ...), to form a plurality of control groups (1A,1B, ...), the centralized transmission line (2T) is connected with the air conditioning control units (11-C, 11-C, ...) in the respective control groups (1A,1B) so as to be data-transmittable with the respective local transmission lines (2S,2S, ...), and each of the air conditioning control units (11-C, 11-C, ...) comprises:

master unit declaration means (4B) that outputs a master unit declaration signal at set time intervals when the thermal-source-side control unit (11-C) is determined to be a master unit, and slave unit determining means (4C) for determining the air conditioning control unit (11-C) to be a slave unit when receiving a master unit declaration signal from another air conditioning control unit (11-C).

10. The air conditioning device according to claim 9, further comprising forcedly setting means (B1) for externally forcedly inputting a master unit setting signal to the master unit declaration means (4B) so that the master unit declaration means (4B) outputs a master unit declaration signal.

11. The air conditioning device according to claim 9, wherein the air-conditioning control unit (11-C) comprises master-to-slave unit change means (4D) that when receiving a power superposition signal from a centralized controller connected to the centralized transmission line (2T) with outputting a master unit declaration signal, disconnects the power source and the communication lines (20) from each other and outputs a master unit canceling signal to the master unit declaration means (4B) to stop the output of the master unit declaration signal thereby changing the thermal-source-side control unit (11-C) to a slave unit.

12. The air conditioning device according to claim 1, wherein data transmission is made so as to transmit AMI signals.

* * * * *